United States Patent [19]
Irie et al.

[11] Patent Number: 5,579,080
[45] Date of Patent: Nov. 26, 1996

[54] CAMERA INCLUDING AN APPARATUS FOR DETECTING A LINE OF SIGHT

[75] Inventors: Yoshiaki Irie; Akira Yamada, both of Yokohama; Akihiko Nagano, Ichihara, all of Japan

[73] Assignee: Canon Kabushiki Kaisha, Tokyo, Japan

[21] Appl. No.: 614,907

[22] Filed: Mar. 13, 1996

Related U.S. Application Data

[63] Continuation of Ser. No. 142,061, Oct. 28, 1993, abandoned.

[30] Foreign Application Priority Data

Oct. 28, 1992 [JP] Japan ........................... 4-290373
Oct. 28, 1992 [JP] Japan ........................... 4-290401
Oct. 28, 1992 [JP] Japan ........................... 4-290402

[51] Int. Cl.⁶ .................................................. G03B 7/00
[52] U.S. Cl. ............................................ 396/51; 396/234
[58] Field of Search ...................................... 354/410, 400, 354/402, 432, 219, 414

[56] References Cited

U.S. PATENT DOCUMENTS

| | | | |
|---|---|---|---|
| 4,774,401 | 9/1988 | Yamada et al. | 250/201 |
| 5,111,231 | 5/1992 | Tokunaga | 354/402 |
| 5,253,008 | 10/1993 | Konishi et al. | 354/402 |
| 5,258,803 | 11/1993 | Hayakawa | 354/402 |
| 5,296,888 | 3/1994 | Yamada | 354/402 |
| 5,392,091 | 2/1995 | Iwasaki . | |

*Primary Examiner*—Russell E. Adams
*Attorney, Agent, or Firm*—Fitzpatrick, Cella, Harper & Scinto

[57] ABSTRACT

A camera is provided having a line-of-sight detecting device for detecting a line of sight of an observer, photometric means for detecting luminances of subareas into which a luminance detection area is partitioned, a selecting means for selecting a specific subarea from the plurality of subareas on the basis of information on the line of sight detected by the line-of-sight detecting means, and a calculating means for weighting the luminances of the plurality of subareas on the basis of the specific subarea selected by the selecting means.

27 Claims, 17 Drawing Sheets

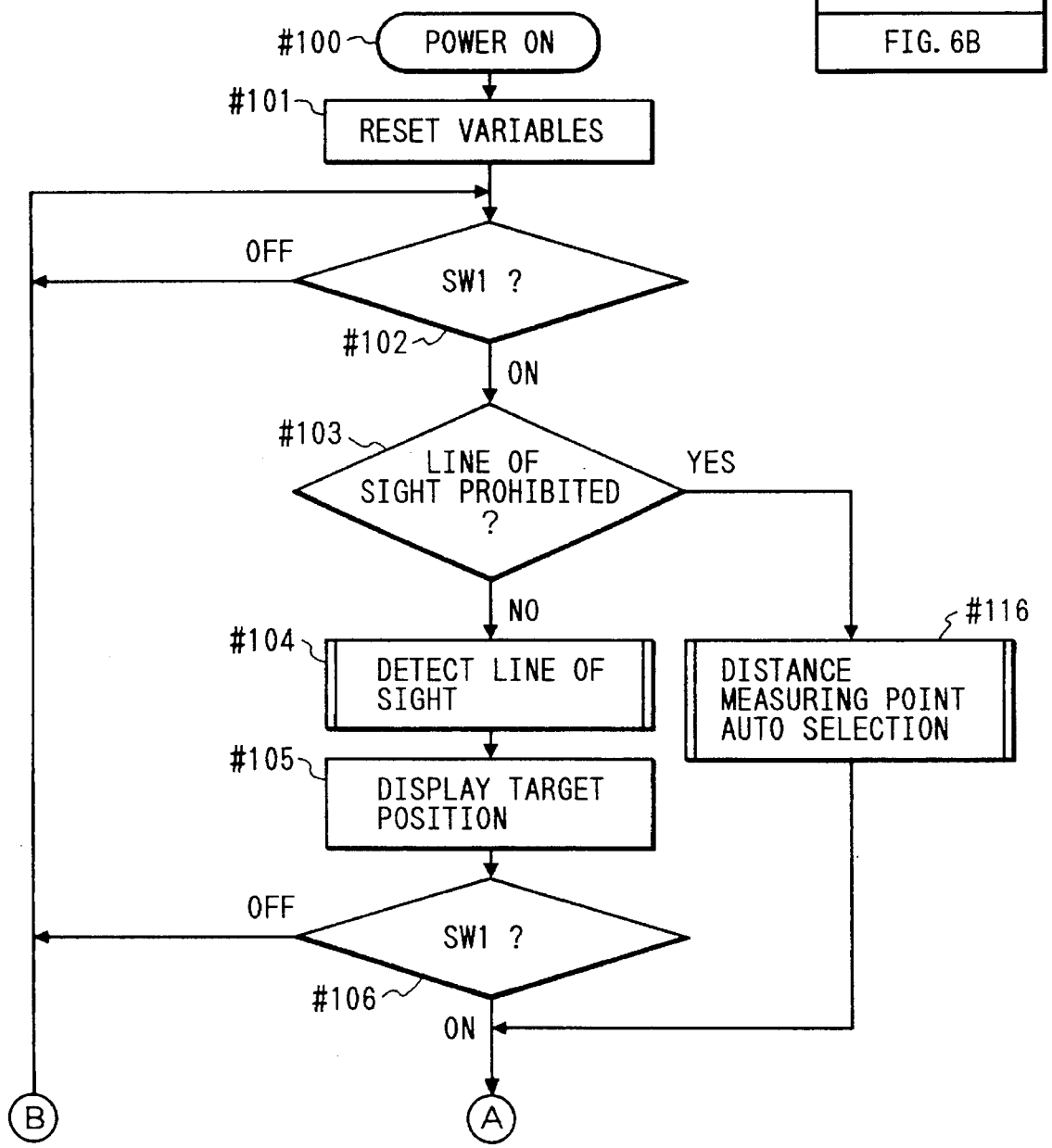

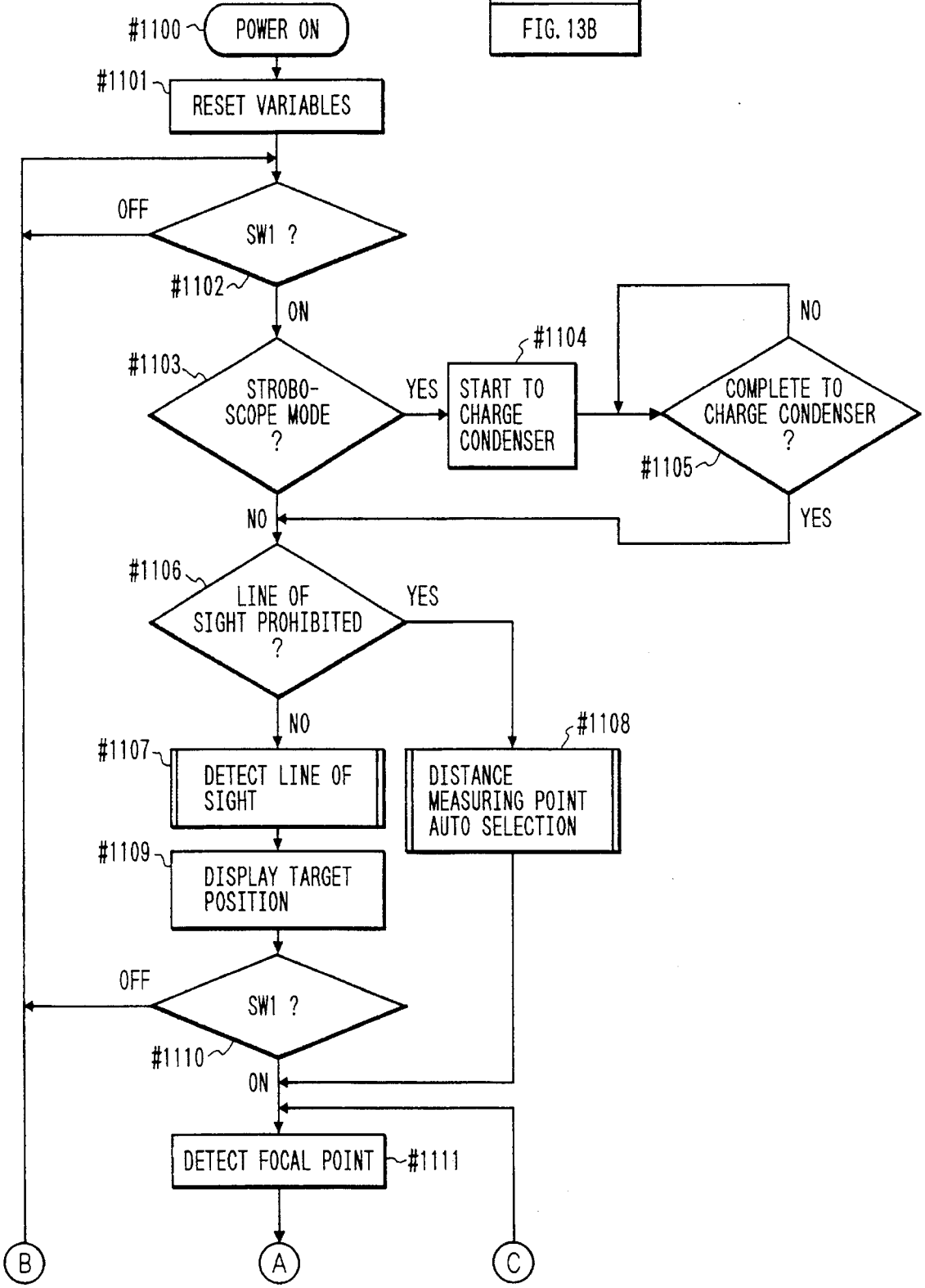

CAMERA INCLUDING AN APPARATUS FOR DETECTING A LINE OF SIGHT

This application is a continuation of application Ser. No. 08/142,061 filed Oct. 28, 1993, now abandoned.

BACKGROUND OF THE INVENTION

1. Field of the Invention

The present invention relates to a camera including a line-of-sight detecting apparatus for detecting a line of sight of an observer.

2. Description of the Related Art

There have been proposed a wide variety of apparatuses for detecting a position at which the observer gazes on a viewing plane, i.e., a so-called a line of sight (visual axis). A method of detecting the line of sight in, e.g., U.S. patent application Ser. No. 003,954 involves the steps of projecting a parallel light from a light source on a front part of the observer's eyeball and thus obtaining the visual axis from the cornea reflection image of the reflected light from the cornea and an imaging position of the pupil.

Further, there have been made some proposals in which a photometric mode for determining an auto exposure of the camera by using line-of-sight information of the observer is changed. According to U.S. patent application Ser. No. 958,482, the line of sight of the observer is detected, and a photometric value is varied corresponding to a state of distribution of eye-gazing points (target positions). Concretely, the center priority average photometry and the spot photometry are selected. In addition, there has been a proposal in which the observer's line of sight is detected, one or more areas are selected from a plurality of partitioned areas by using the line-of-sight information, and luminances of the selected areas are weight-averaged to obtain a photometric value.

Moreover, there have been also proposed multiple photometric apparatuses constructed to give a proper exposure to the photographing picture by outputting and using a plurality of luminance signals of a plurality of respective areas into which the field is partitioned. However, there exist a comparatively small number of proposals of photometric apparatuses for accurately judging whether or not a flash of light should be emitted.

According to U.S. patent application Ser. No. 646,248, there is proposed a photometric apparatus in a camera having focus detecting means so constructed as to be capable of detecting focal points of a plurality of areas within the photographing picture. The photometric apparatus comprises light receiving means for detecting luminances of a plurality of subareas into which the field is partitioned and detection area selecting means for selecting one of the plurality of focus detection areas. Information on a luminance of the subarea including the focus detection area selected by the focus detecting means is compared with information on a maximum luminance in the plurality of subareas, thereby determining whether the flash of light is emitted or not.

However, the following problems arise. In the above proposals, the luminance information of the subarea including the focus detection area is determined by the plurality of focus detecting means. The luminance of the principal subject intended by the photographer is not necessarily measured. That is, the algorithm for determining a focus detecting position is employed in the focus detecting means so constructed as to be capable of detecting the focal points of the plurality of areas within the photographing picture. This algorithm generally takes a so-called near priority mode in which a subject closest to the camera is defined as a principal photographing subject in terms of probability. Hence, if the photographer takes a shot of an object as the principal subject other than the closest object within the photographing picture, a problem is that the condition for emitting the flash of light is not well judged.

A large number of cameras in a detecting system have hitherto been proposed, the arrangement being such that the flash of light is emitted toward the subject, and a quantity of light emitted is determined corresponding to an intensity (light quantity) of the reflected light after detecting the reflected light from the subject. In the majority of those cameras, however, the photometry is effected in concentration on the center of the picture by means of a single piece of photometric (detecting) sensor. For this reason, if the principal subject is relatively small on the picture or in a position off the center of the picture, the photometric sensor undergoes an influence from the background. This results in such a problem that a proper quantity of light cannot be obtained.

Further, a proposal against the above-mentioned problems has been made in U.S. Pat. No. 5,111,231 by the present applicant. Provided is a focus detecting means for obtaining focus detection information of areas corresponding to a plurality of detecting areas. Output information of each detecting area is evaluated based on focus information of each area which is given from the focus detecting means. A flash emitting quantity is controlled.

SUMMARY OF THE INVENTION

It is a primary object of the present invention to provide a camera capable of obtaining a photometric value with the principal subject being centered.

According to one aspect of the invention, there is provided a camera in which a specific subarea is selected based on information on a line of sight of an observer, and the photometric value is thus obtained in accordance with a classification based on the selection of the specific subarea in a camera constructed to partition a field into a plurality of subareas and detect luminances of the respective subareas.

It is another object of the present invention to provide a camera capable of accurately distinguishing an emission of a flash of light.

According to another aspect of the invention, there is provided a camera in which whether the emission of the flash of light is required or not is judged on the basis of the line-of-sight information of the observer in a camera constructed to partition a field into a plurality of subareas and detect luminances of the respective subareas.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Figure 1:
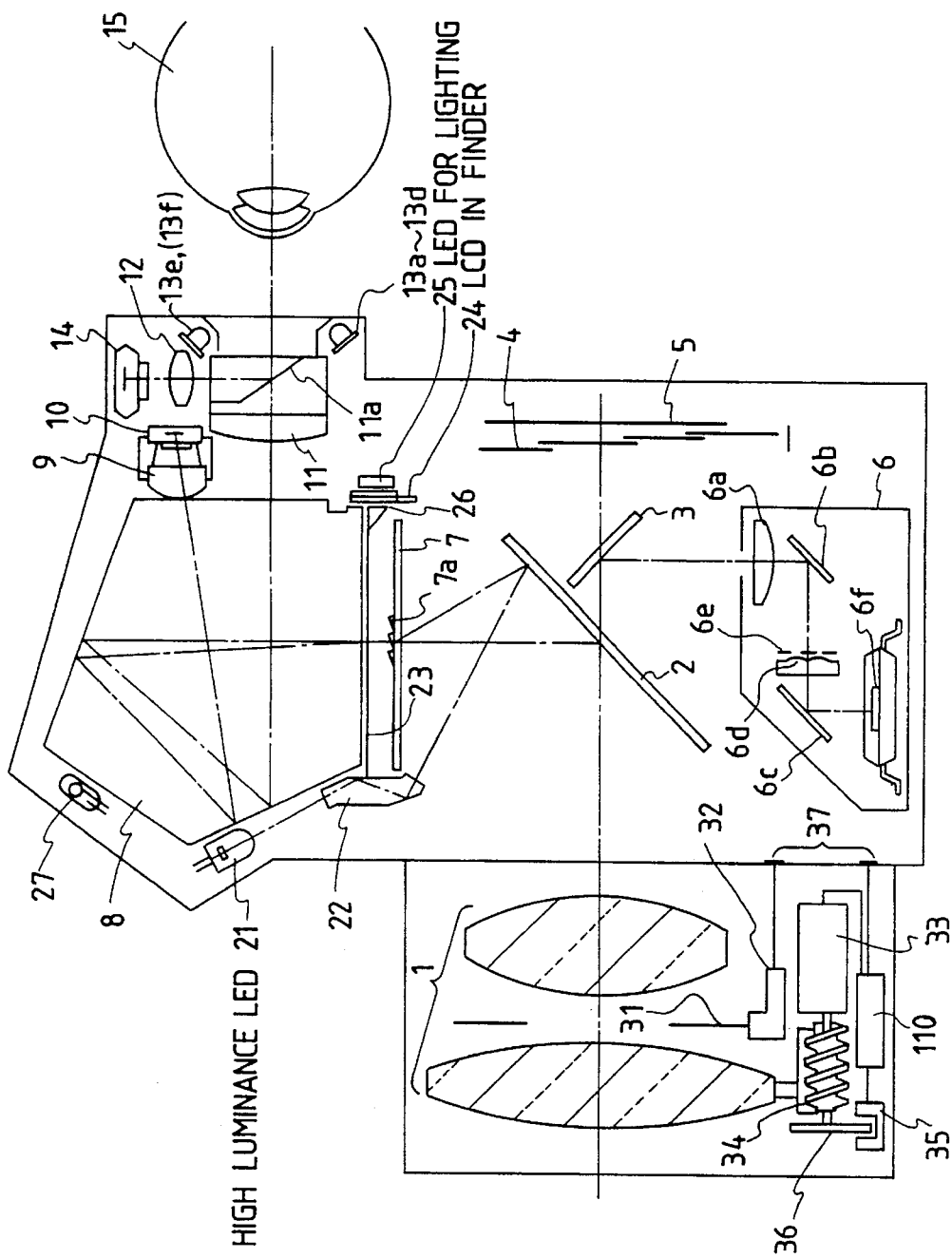
FIG. 1 is a schematic view showing a single-lens reflex camera in a first embodiment.
Figure 2A:
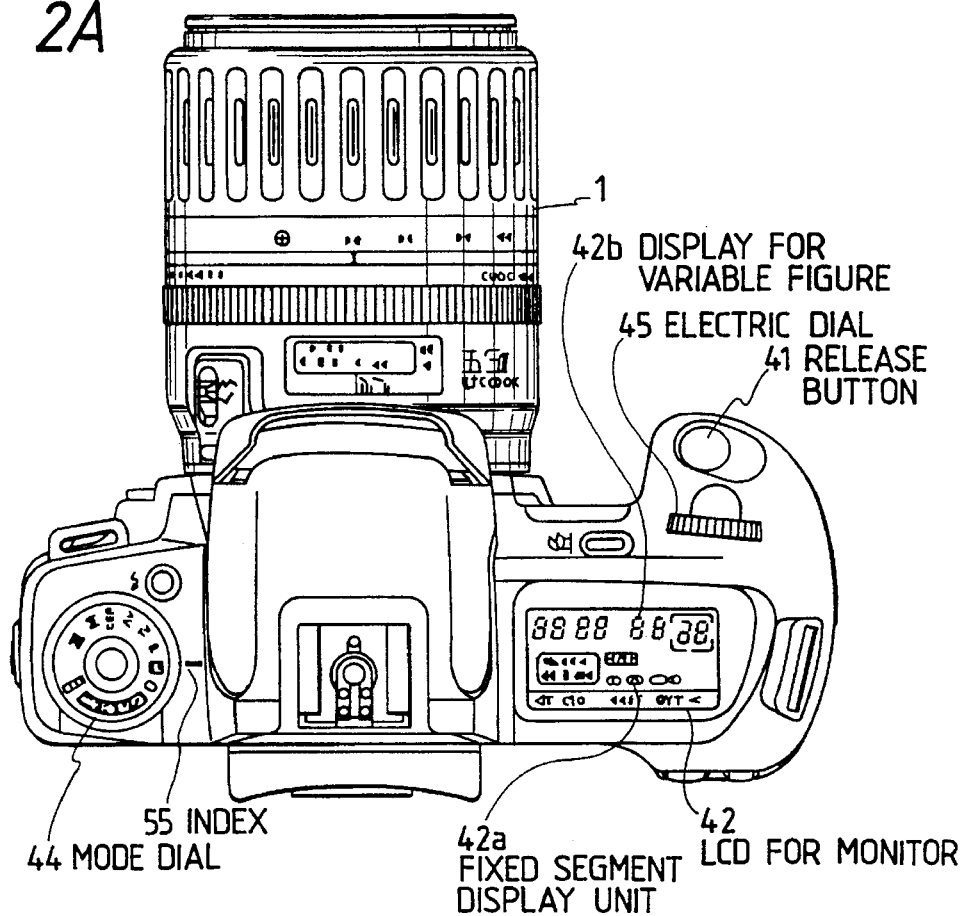
FIGS. 2A and 2B are views each showing an external appearance of the single-lens reflex camera in the first embodiment.
Figure 2B:
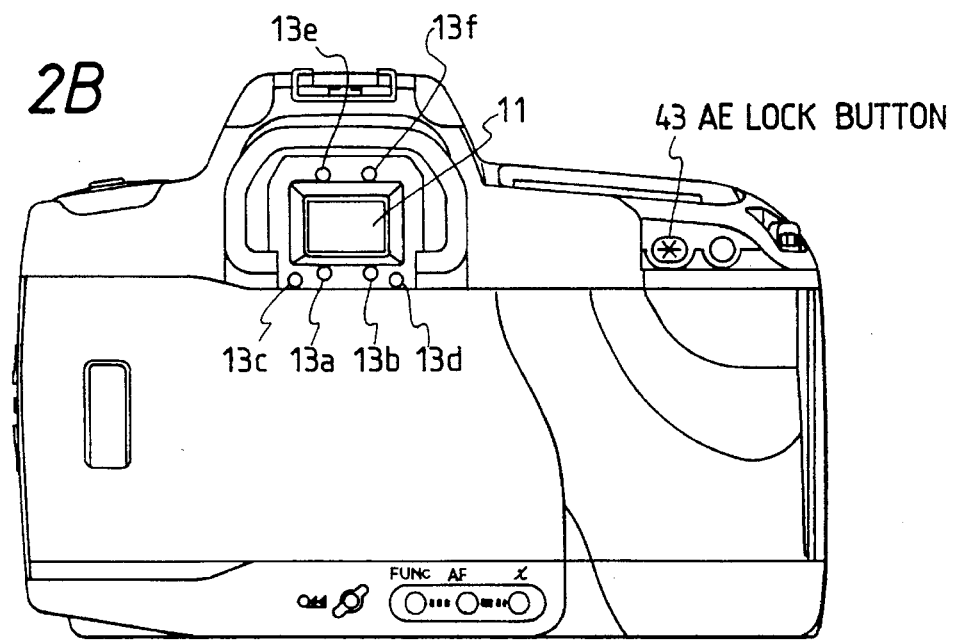
Figure 3:
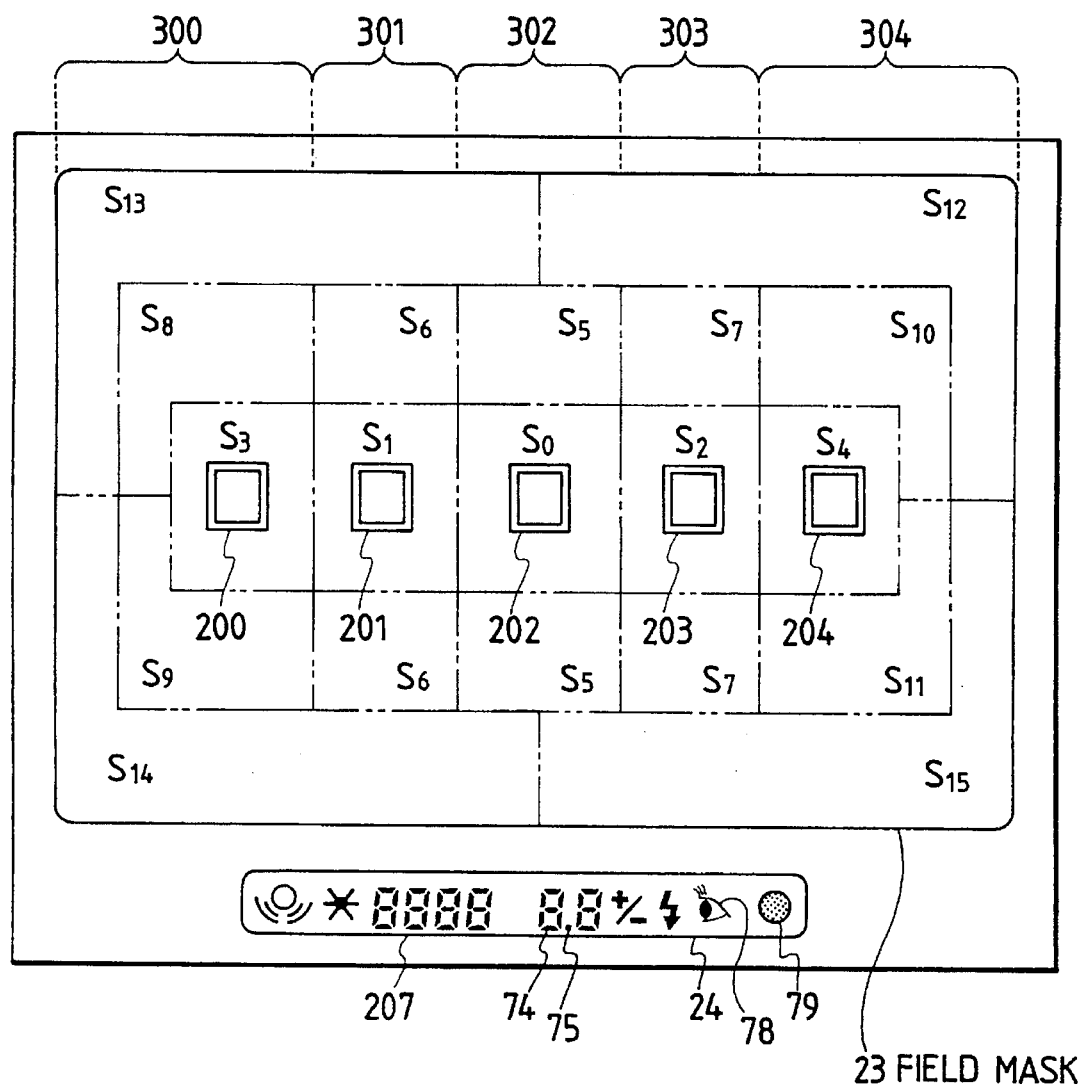
FIG. 3 is a view illustrating a field of a finder in the first embodiment.

FIGS. 1 through 9 illustrate a first embodiment of the present invention. FIG. 1 is a schematic view of a single-lens reflex camera according to this invention. FIG. 2A is a view of an external appearance of the single-lens reflex camera as viewed from above. FIG. 2B is a rear side elevation of the single-lens reflex camera. FIG. 3 is a view showing a visual field of a finder. Throughout the respective FIGURES, a photographing lens is, though illustrated in a 2-lens configuration for convenience, actually constructed of a larger number of lenses as is well known. A main mirror 2 is obliquely disposed on a photographing light path or moved off the light path in accordance with a viewing state and a photographing state. A submirror 3 reflects a part of light beams penetrating the main mirror 2 towards a lower part of a camera body. The numeral 4 designates a shutter. A photosensitive member 5 is a silver halide film or a solid-state imaging device such as a CCD or MOS type or another imaging device. A focus detecting device 6 of a known phase-difference system consists of a file lens 6a disposed in the vicinity of an image-forming plane, reflecting mirrors 6b, 6c, a secondary imaging lens 6d, an aperture 6e and a line sensor composed of a plurality of CCDs. As illustrated in FIG. 3, the focus detecting device 6 is constructed to be capable of detecting a focus with respect to a plurality of in-field areas (five points indicated by detection point marks 200–204). A focusing screen 7 is disposed on a predetermined image-forming plane of the photographing lens 1. A pentaprism 8 serves to change the finder light path. The numerals 9, 10 denote an imaging lens and a photometric sensor which serve to measure a luminance of the subject in a viewing picture (field). The imaging lens 9 brings the focusing screen 7 and the photometric sensor into a conjugate relationship through a reflection light path within the pentaprism 8.

Next, an eyepiece 11 having a beam splitter 11a is disposed in rear of an outgoing surface of the pentaprism 8. The eyepiece 11 is employed for a photographer's eye 15 which views the focusing screen 7. The beam splitter 11a is, e.g., a dichroic mirror which transmits the visible light but reflects the infrared light. The numeral 12 represents a light receiving lens. The numeral 14 designates an image sensor in which trains of photoelectric elements such as CCDs are two-dimensionally arranged. The image sensor 14 is so disposed as to be conjugate to the vicinity of a pupil of the photographer's eye 15 existing in a predetermined position with respect to the light receiving lens 12. Infrared light emitting diodes 13a–13f serving as an illumination light source are disposed around the eyepiece 11.

A high-luminance LED 21 is visually recognizable even in a bright subject. The light emitted therefrom is reflected by a projection prism 22 and the main mirror 2. The light is then deflected in a microprism array 7a provided on a display portion of the focusing screen 7. The light passes through the pentaprism 8 and the eyepiece 11 and reaches the photographer's eye. Now, the microprism arrays 7a are formed like a frame in positions corresponding to the focus detection areas of the focusing screen 7. The microprism arrays 7a are illuminated with light beams of five superimpose LEDs 21 (marked with LED-L1, LED-L2, LED-C, LED-R1, LED-R2, respectively) corresponding thereto. As can be understood from FIG. 3 showing the finder field, the respective detection point marks 200, 201, 202, 203, 204 flash within the finder field, thus displaying the focus detection areas (points of detection) (this will hereinafter be termed a superimpose display). A field mask 23 forms the finder field area (substantially coincident with the field). An in-finder LCD 24 is intended to display photographing information outwardly of the finder field. The in-finder LCD 24 is illuminated with the light from a flash LED (F-LED) 25. The light penetrating the LCD 24 is led via a triangular prism 26 into the finder. As illustrated in FIG. 3, the photographing information is displayed an out-of-finder-picture portion 207. The photographer can be thus informed of the photographing information. A mercury switch 27 detects a camera position.

An aperture 31 is provided within the photographing lens 1. An aperture drive unit 32 includes an aperture drive circuit 111 which will be mentioned later. The numeral 33 designates a lens driving motor. A lens driving member 34 consists of a driving gear or the like. A photo coupler 35 detects a rotation of a pulse plate 36 interlocking with the lens driving member 34. The photo coupler 35 then informs a lens focus adjusting circuit 110 of this rotation. The focus adjusting circuit 110 actuates the lens driving motor by a predetermined quantity on the basis of this information and a bit of information on a lens driving quantity given from the camera. The photographing lens 1 is thereby moved to an in-focus position. A mount contact point 37 serves as an interface between the known camera and lens.

Turning to FIGS. 2A and 2B, the numeral 41 represents a release button. A monitor LCD 42 as an outside monitor display device is composed of a fixed segment display portion 42a for displaying a predetermined pattern and a 7-segment display portion 42b for displaying variable figures. An AE lock button 43 retains a photometric value. A mode dial 44 selects a photographing mode, etc. Other operating members are not particularly needed for understanding the present invention and are therefore omitted.

FIG. 3 depicts a finder field of the camera. A photometric sensor 10 is partitioned into 16 subareas S0–S15. When projected within the finder picture shown in FIG. 3, corresponding to the focus detection point marks 200, 201, 202, 203, 204 from the left side of the finder picture, the areas including the respective detection points correspond to the photometric subareas of the photometric sensors S3, S1, S0, S2, S4; and the photometric subareas of the sensors S5–S15 are arranged along the periphery thereof.

The present camera, though a detailed explanation will be given later, detects a line of sight of the photographer and determines a line-of-sight position on the focusing screen on which a photographing subject is projected. When this line-of-sight position is included in any one of X-directional areas 300, 301, 302, 303, 304 on focusing screen coordinates, any one of the detection point marks 200–204 corresponding to these areas is flashed. The camera thus informs the photographer of the line-of-sight position.

Figure 5:
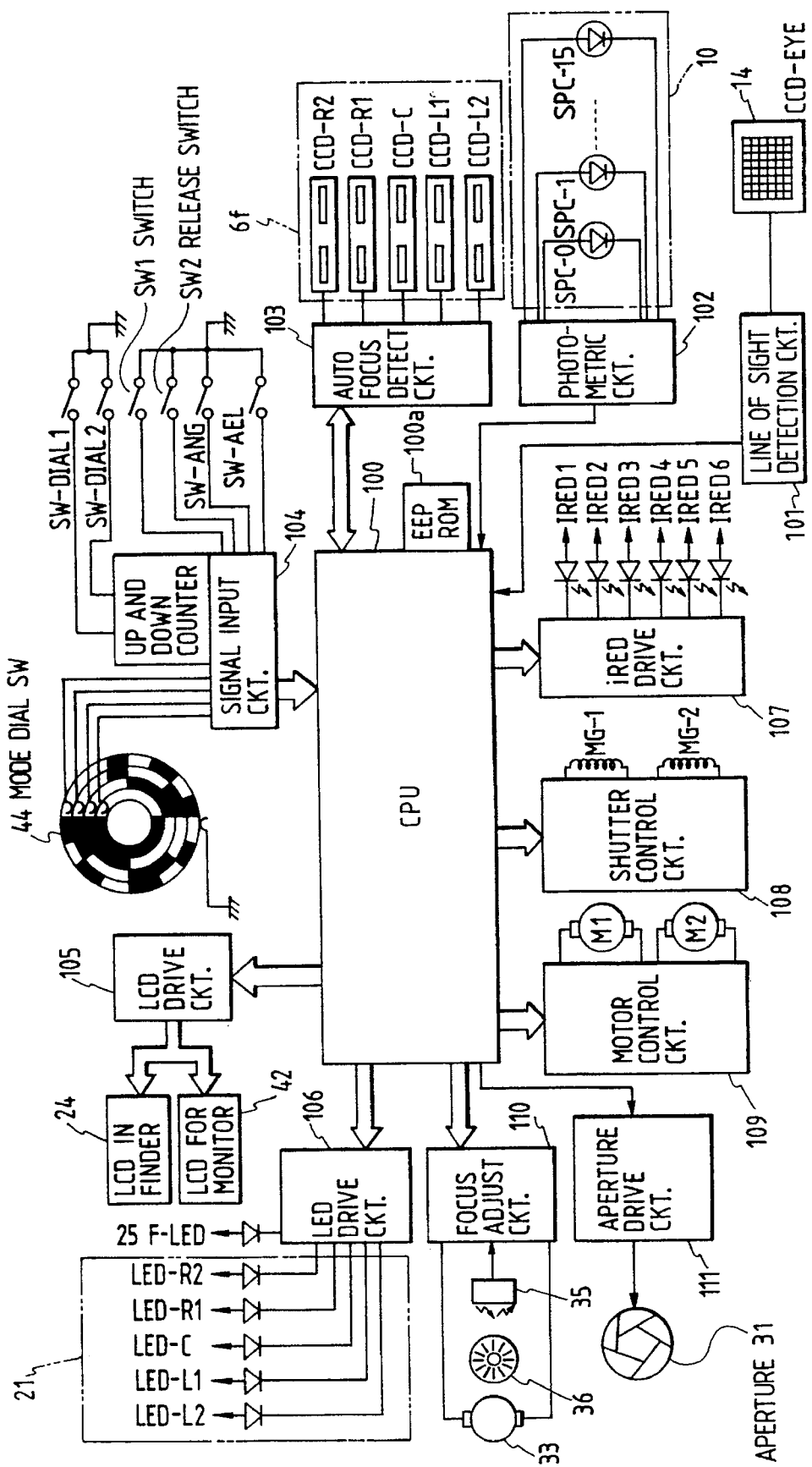
FIG. 5 is a diagram showing an electric circuit of a camera in the first embodiment.

FIG. 5 is a diagram of an electric circuit built in the camera of this invention. The same elements as those in FIGS. 1, 2A and 2B are marked with like numerals. Connected to a central processing unit (hereinafter abbreviated to CPU) 100 of a built-in microcomputer of the camera body are a light-of-sight detection circuit 101, a photometric circuit 102, a focus detection circuit 103, a signal inputting circuit 104, an LCD drive circuit 105, an LED drive circuit 106, an IRED drive circuit 107, a shutter control circuit 108 and a motor control circuit 109. Further, signals are transmitted via the mount contact point 37 shown in FIG. 1 between the aperture drive circuit 111 and the focus adjust circuit 110 incorporated into the photographing lens.

An EEPROM 100a belonging to the CPU 100 incorporates a function to store line-of-sight calibration data. When setting a [CAL] position of the mode dial 44 to the index, a calibration mode for compensating a line-of-sight difference between individuals is selectable. Further, in the calibration mode, an electronic dial 45 is capable of selecting a calibration data number and setting a line-of-sight detection prohibit mode. Plural items of calibration data can be set. The calibration data are effective in setting by distinguishing camera users and viewing conditions which differ according to, e.g., whether spectacles are worn even in the case of the same user or whether an eyesight correction lens is used. Further, the EEPROM 100a stores the calibration data number selected at this time or a status of the set line-of-sight prohibit mode.

The line-of-sight detection circuit 101 A/D converts an output of an eyeball image from an image sensor 14 (CCD-EYE). The circuit 101 then transmits this image information to the CPU. The CPU 100, as will be mentioned later, samples respective characteristic points of the eyeball image that are necessary for detecting the line of sight in accordance with a predetermined algorithm. The CPU 100 further calculates the line of sight of the photographer from positions of the respective characteristic points.

The photometric circuit 102 performs, after amplifying an output from the photometric sensor 10, a logarithmic compression and an A/D conversion. The results are transferred as luminance information of the sensor per subarea to the CPU 100. The line sensor 6f is, as stated before, a known CCD line sensor constructed of five line sensors CCD-L2, CCD-L1, CCD-LC, CCD-R1, CCD-R2 corresponding to the five detection points 200–204 within the picture. The focus detection circuit 103 A/D converts a voltage obtained from the line sensor 6f and transmits the result to the CPU. A photometric switch SW-1 is turned ON at a first stroke of the release button 41 to start the photometry, auto-focusing (AF) and the line-of-sight detection. A release switch SW-2 is turned ON at a second stroke of the release button. A position detection switch SW-ANG is detected by the mercury switch 27. An AE lock switch SW-AEL is turned ON by depressing the AE lock button 43. Dial switches SW-DIAL1, SW-DIAL2 are provided in the electronic dial which has already been explained, signals thereof are inputted to an up-and-down counter of a signal input circuit 104, thereby counting a rotational click quantity of the electronic dial 45. Dial switches SW-M1–SW-M4 are provided in the mode dial which has already been explained, signals thereof are inputted to the signal input circuit 104 and transmitted via a data bus to the CPU 100.

A known LCD drive circuit 105 display-drives a liquid crystal display element LCD. In accordance with the signals from the CPU 100, the LCD drive circuit 105 is capable of causing both a monitor LCD 42 and an in-finder LCD 24 to simultaneously display an f-number, a shutter speed and a set photographing mode. An LED drive circuit 106 performs lighting/flashing control of the flash LED (F-LED) 22 and the superimpose LED 21. An IRED drive circuit 107 selectively flashes infrared light emitting diodes (IRED1—6) 13a–13f according particular situations. A shutter control circuit 108 controls a magnet MG-1 for tripping a front blade-set when energized and a magnet MG-2 for tripping a rear blade-set. A photosensitive material is thus exposed to a predetermined quantity of light. A motor control circuit 109 controls a motor M1 for winding and rewinding a film and a motor M2 for effecting a charge on the main mirror 2 and the shutter 4. A release sequence of the camera is operated by the shutter control circuit 108 and the motor control circuit 109.

Figure 6B:
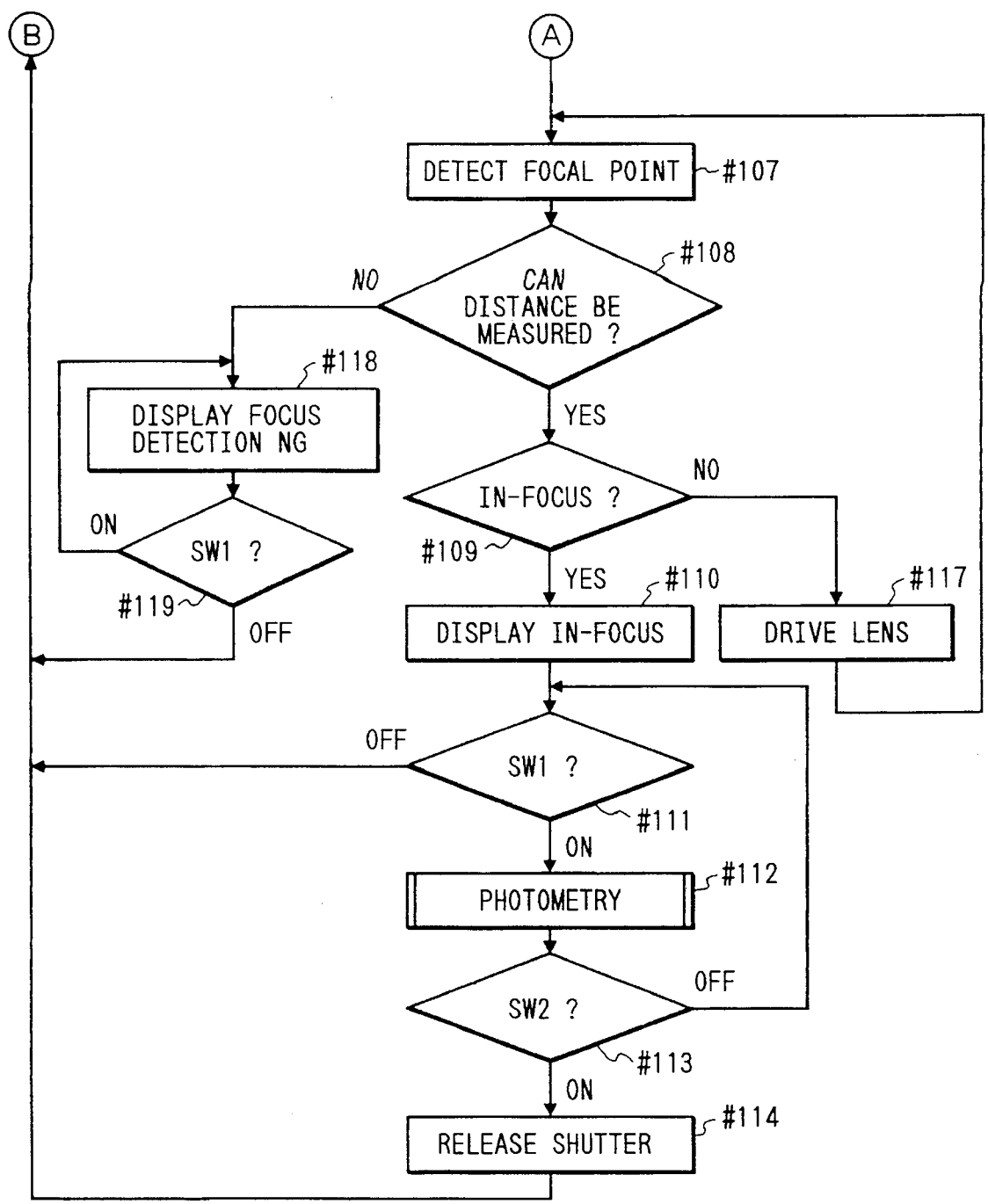
FIG. 6, which consists of FIGS. 6A and 6B, is a flowchart showing actions of the camera in the first embodiment.

FIG. 6 is a flowchart showing operations of the camera including the line-of-sight detecting apparatus. In-finder display states in this instance will be explained with reference to FIG. 3.

The camera is set to a predetermined photographing mode from a non-active status by rotating the mode dial 44 (an explanation will be given based on the case of being set to a shutter-priority AE in this embodiment). Then, a power supply of the camera is switched ON (#100). Reset are line-of-sight detection oriented variables other than the line-of-sight calibration data stored in the EEPROM 100a of the CPU 100 (#101). Then, the camera waits till the switch SW1 is turned ON by depressing the release button 41 (#102). The signal input circuit 104 detects turning-ON of the switch SW1 upon depressing the release button 41. The CPU 100 makes sure which calibration data to use when the line-of-sight detection circuit 101 detects a line of sight. At this time, if the calibration data of the calibration data number remains to be an initial value but is not changed, or if set in the line-of-sight prohibit mode (#103), a given focus detection point is selected by a focus detection point auto selection subroutine without executing the line-of-sight detection, i.e., without employing the line-of-sight information (#106).

The auto focus detection circuit 103 detects a focal point at this focus detection point (#107). There are some thinkable methods as algorithms of the focus detection point auto selection. However, a near-point priority algorithm known in the multipoint AF camera is effective, wherein a weight is placed on a central focus detection point.

Further, it is recognized that the above line-of-sight calibration data is set to the predetermined calibration data number, and the data is inputted from the photographer. In this case, the line-of-sight detection circuit 101 detects the line of sight in accordance with the data (#104). Note that the action in step 104 is shown in detail in FIGS. 7 and 8. At this time, the LED drive circuit 106 flashes the flash LED (F-LED) 22. The LCD drive circuit 105 flashes a line-ofsight input mark 78 of the in-finder LCD 24. The photographer can thus recognize a state where the camera is on the detection of the line of sight through the out-of-finder-picture portion 207. Note that the line of sight detected by the line-of-sight detection circuit 101 is transformed into eye-gazing point (target position) coordinates on the focusing screen 7 (step #214 in FIG. 8 which will be discussed later).

Line-of-sight position recognizing areas for determining the light-of-sight position are indicated by the numerals 300, 301, 302, 303, 304 in FIG. 3. The CPU 100 judges at which area, in particular, at which, line-of-sight position recognizing area, the target position exists among the areas 300–304. A focus detection point corresponding to this area is selected.

Figure 4:
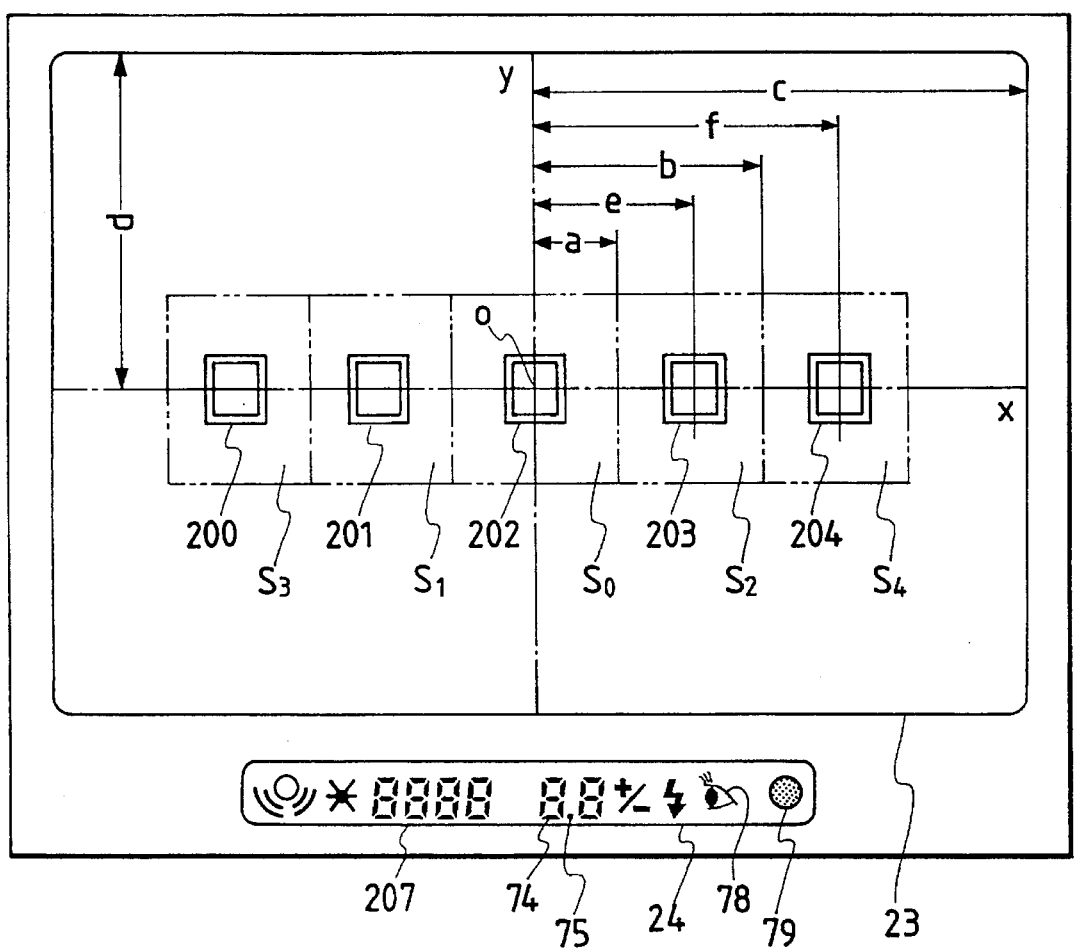
FIG. 4 is a view illustrating the field of the finder in the first embodiment.

Paying attention to FIG. 3, photometric areas S3, S1, S0, S2, S4 of a 16-partitioned photometric sensor indicate a range from a highest-sensitivity position in each photometric sensitivity distribution down to a 4-level-down position. Each boundary thereof is the one where the photometric sensitivity abruptly changes. FIG. 4 shows coordinates of the photometric areas on the focusing screen. In FIG. 4, the numeral 0 represents an optical axis in the finder optical system of the camera. The centers of an area $S_0$ and of the detection point mark 202 coincide with the optical axis of the camera. The right side from the optical axis is set as a plus (+) direction of the X-axis. The upward direction from the optical axis is set as a minus (−) direction of the Y-axis. In this case, the respective areas and the positions of the focus detection points are symmetric with respect to the X- and Y-axes. The area 302 (x2, y0) can be expressed such as $-a<x2<a$, $-d\leq y0\leq d$ on the focusing screen. Similarly, the areas 300 (x0, y0), 301 (x1, y0), 303 (x3, y0), 304 (x4, y0) can be expressed such as $-c\leq x0\leq -b$, $-b<x1\leq -a$, $a\leq x3<b$, $b\leq x4\leq c$. Hence, let (x, y) be the coordinate of the target position, and it is possible to specify which area to include the target position among the areas 300–304.

As obvious in FIG. 3, the boundaries of the line-of-sight position recognizing areas 300–304 are set based on only the X coordinates. Then, any one of the above line-of-sight position recognizing areas is selected from coordinate information of the target position.

Further, if the target position is not included in any areas 300–304, the in-finder line-of-sight input mark 78 is flash-displayed as a line-of-sight undetectable indication. Besides, as shown in FIG. 3, the five detection point marks 200–204 are located substantially in the centers of the five areas $S_0$–$S_4$.

The CPU 100 transmits, after selecting the focus detection point, the signal to the display circuit 106 and causes any one of the detection point marks 200–204 to be flash-displayed by use of the superimpose LED 21 (#105). Further, at this time, if a focus detection point different from the intention of the photographer is flashed due to a deterioration in detection accuracy of the target position coordinates detected by the line-of-sight detection circuit 101, the CPU 100 recognizes that the detection point selected from the line of sight of the photographer is not correct. Then, the photographer separates his hand from the release button 41 and turns OFF the switch SW1 (#106). The camera waits till the switch SW1 is turned ON (#102).

Figure 9:
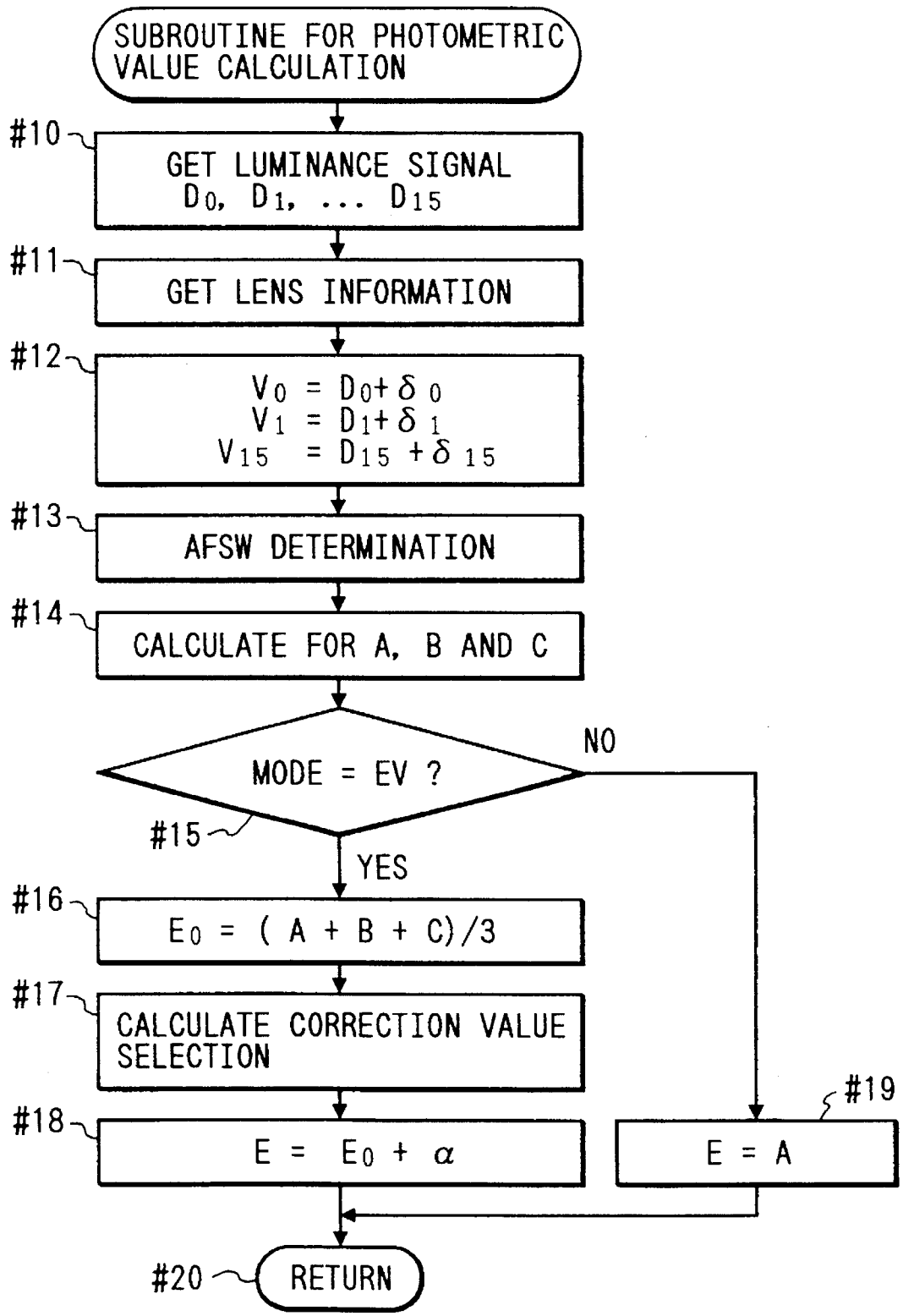
FIG. 9 is a flowchart showing a calculation of a photometric value in the first embodiment.

Further, the photographer sees the detection point displayed, which point is selected from the line of sight. Then, if the switch SW1 is consecutively kept ON (#106), the auto focus detection circuit 103 executes the focus detection by use of the line sensor corresponding to the focus detection point selected (#107). Judged herein is whether or not the detection point selected is in the focus undetectable state (#108). If undetectable, the CPU 100 transmits the signal to the LCD drive circuit 105 and flashes an in-focus mark 79 of the in-finder LCD 24, thus giving the photographer an alert indicating that the focus detection is NG (#118). The alert continues till separation from switch SW1 is made (#119). If the detectable, and when a focus adjusting state of the detection point selected by the predetermined algorithm is not in focus (#109), the CPU 100 transmits the signal to a lens focus adjusting circuit 110 to drive the photographing lens 1 by a predetermined quantity (#117). The auto focus detection circuit 103, after driving the lens, judges whether or not the photographing lens 1 is in focus (#109). If the photographing lens is in focus at the selected detection point, the CPU 100 transmits the signal to the LCD drive circuit 105. The in-focus mark 79 of the in-finder LCD 24 is thereby flashed. Simultaneously, the CPU 100 transmits the signal to the LED drive circuit 106, whereby the in-focus state is displayed through an in-focus detection point mark (#110). At this time, the flash-display of the detection point mark selected from the line of sight is set in a flash state when in focus to make the photographer aware of being focalized. The photographer sees the in-focus detection point displayed within the finder. If the photographer recognizes that the detection point is not correct in terms of position and separates hand from the release button 41 to turn OFF the switch SW1 (#111), the camera consecutively waits till the switch SW1 is turned ON (#102). Further, if the photographer sees the detection point in-focus-displayed and consecutively keeps ON the switch SW1 (#111), the CPU 100 transmits the signal to the photometric circuit 102, thereby effecting the photometry (#112). At this time, all the areas $S_0$–$S_{15}$ are classified based on the specified photometric areas $S_0$–$S_4$ including the in-focus detection point. An exposure value is determined by performing an evaluation photometric calculation in which weighting of each area is conducted based on this classification. FIG. 9 shows the photometric calculation by way of one example in which the photometric area $S_1$ including the detection point 201 is set as a specified subarea in the case of this embodiment. Then, as a result of this calculation, an f-number, e.g., (F 5.6) is displayed by use of 7-segments 74 and a decimal point 75. Judged further is whether or not the switch SW2 is turned ON by depressing the release button 41 (#113). If the switch SW2 is in the OFF-state, the state of the switch SW1 is again confirmed (#111). Whereas if the switch SW2 is turned ON, the CPU 100 transmits the signals to the shutter control circuit 108, the motor control circuit 109 and the aperture drive circuit 111, respectively. To start with, the main mirror 2 flips up when energizing the magnet M2. The aperture 31 is stopped down, and, thereafter, the MG1 is charged with the electricity to open the front blade-set of the shutter 4. The f-number of the aperture 31 and the shutter speed of the shutter 4 are determined based on an exposure value detected by the above photometric circuit 102 and a sensitivity of the film 5. The MG2 is energized after a predetermined shutter time (e.g., 1/250 sec) has elapsed, thereby closing the rear blade-set of the shutter 4. Upon a completion of the exposure on the film 5, the M2 is again energized to perform a mirror-down and a shutter-charge. Simultaneously, the M1 is also energized to feed frames of the film. A shutter release sequence is thus ended (#114). Thereafter, the camera waits till the switch SW1 is again turned ON (#102).

Figure 7:
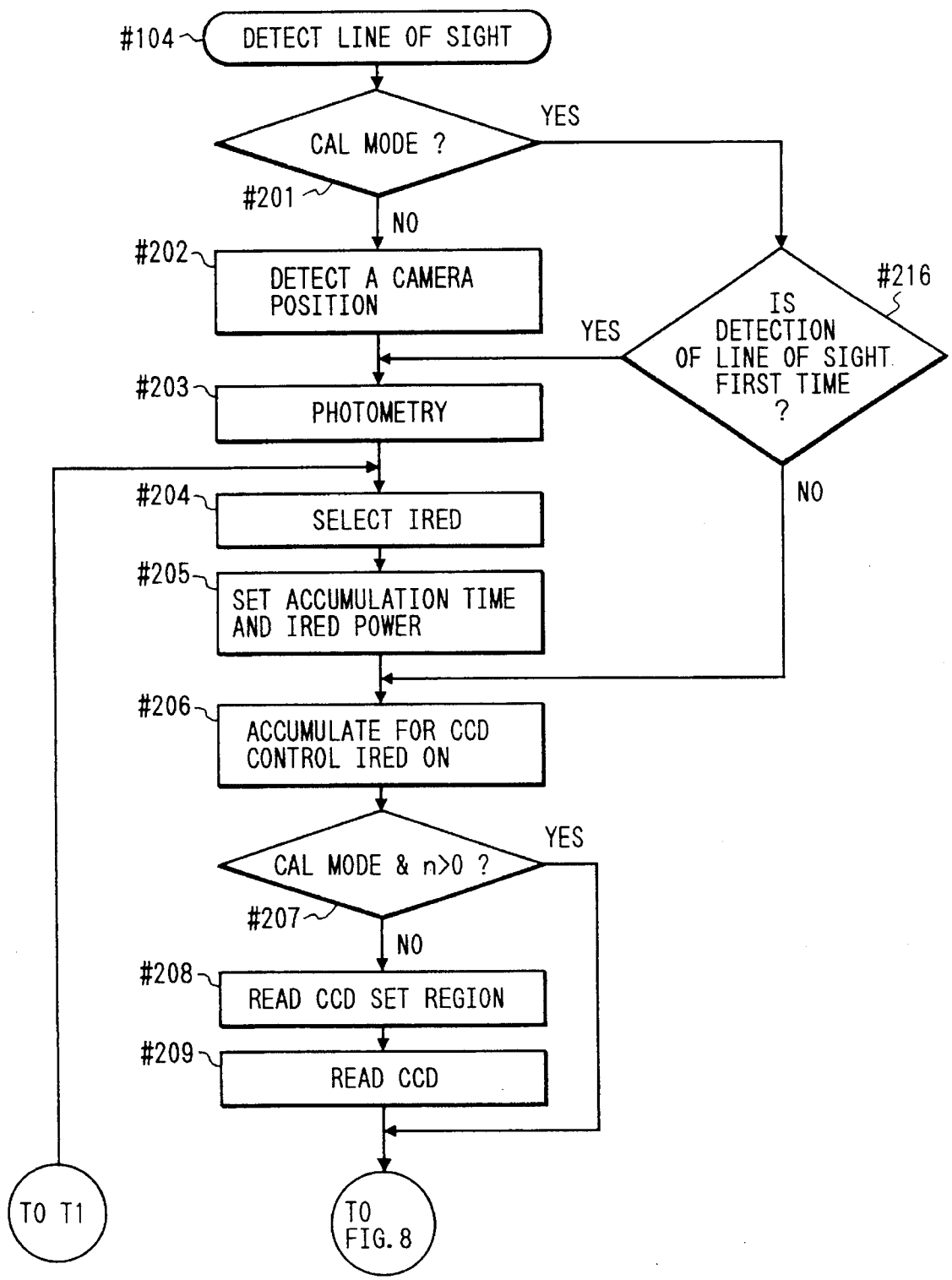
FIG. 7 is a flowchart showing a detection of a line of sight in the first embodiment.
Figure 8:
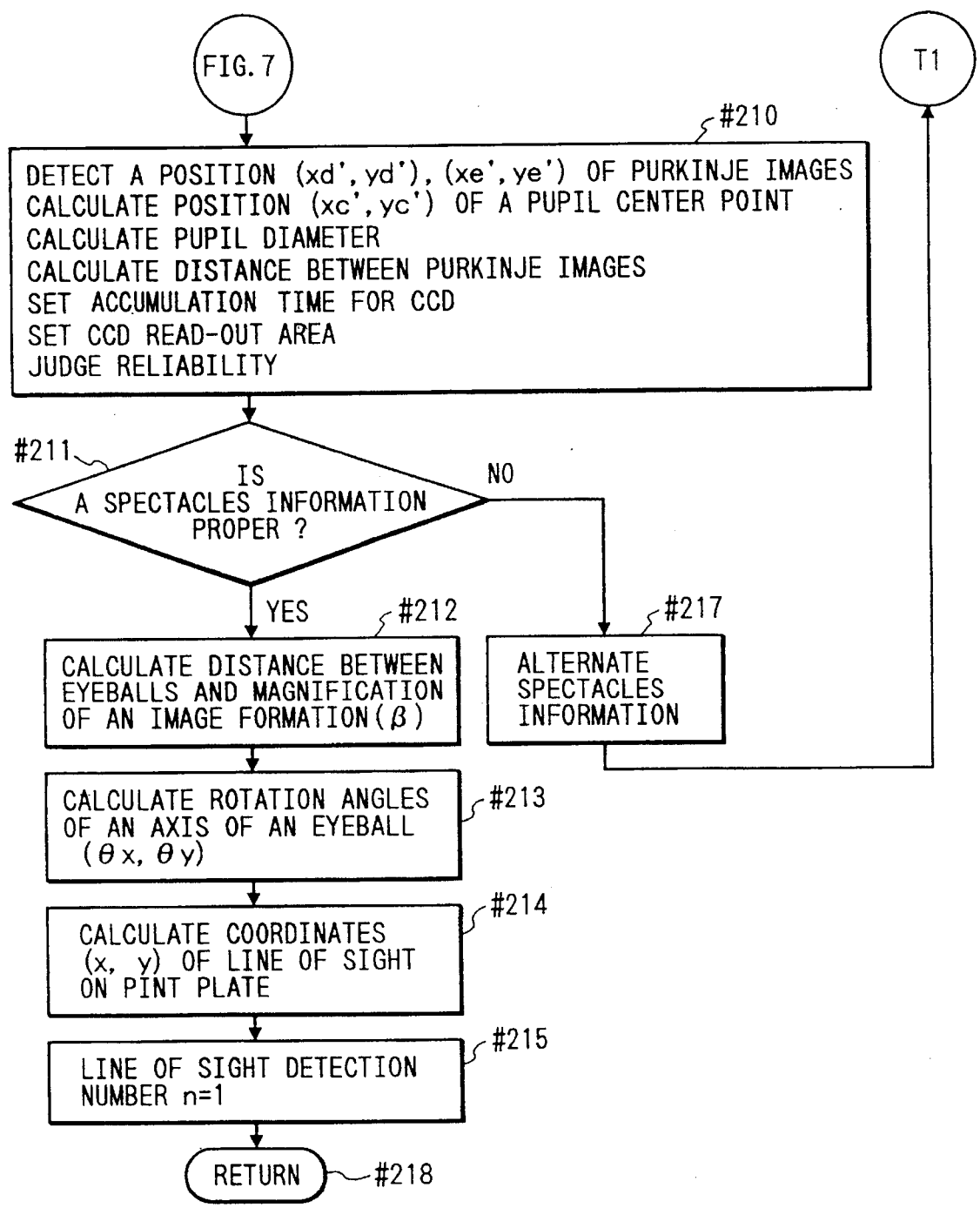
FIG. 8 is a flowchart showing the line-of-sight detection in the first embodiment.

FIGS. 7 and 8 are flowcharts for detecting the line of sight. The line-of-sight detection circuit 101, as explained earlier, detects the line of sight upon receiving the signal from the CPU 100 (#104). The line of sight detection circuit 101 judges whether the line of sight is detected in the photographing mode or in the line-of-sight calibration mode (#201). At the same time, the line-of-sight detection circuit 101 recognizes which calibration data number to set in the camera as will be discussed later.

The line-of-sight detection circuit 101 first detects what camera position to take through the signal input circuit 104 in the case of detecting the line of sight in the photographing mode (#202). The signal input circuit 104 processes an output signal of the mercury switch 27 (SW-ANG). Judged are whether the camera takes a horizontal or vertical position and, if in the vertical position, whether, e.g., the release button 41 is directed to the top or the bottom. Subsequently, a bit of brightness information of the photographing area is obtained from the photometric circuit 102 through the CPU 100 (#203). Next, some of the infrared light emitting diodes (hereinafter abbreviated to IREDs) 13a–13f are selected based on spectacles information of the photographer that is contained in the calibration data as well as on camera position information detected previously (#204). More specifically, when the camera is postured in the horizontal position, and if the photographer does not wear spectacles, as illustrated in FIG. 2B, the IREDs 13a, 13b closer to the finder optical axis are selected. Further, when in the horizontal position, and if the photographer wears spectacles, the IREDs 13c, 13d apart from the finder optical axis are selected. A part of illumination light reflected by the spectacles of the photographer reach portions other than the predetermined areas on the image sensor 14 projected with the eyeball image, and, therefore, the analysis of the eyeball image undergoes no obstacle. Furthermore, when the camera is set in the vertical position, there is selected either a combination of the IREDs 13, 13e or a combination of the IREDs 13b, 13f with which the eyeball of the photographer is illuminated from under.

Next, an accumulation time of the image sensor 14 (hereinafter termed CCD-EYE) and illumination power of the IREDs are set based on the above photometric information and the spectacles information of the photographer (#205). The accumulation time of the CCD-EYE and the illumination power of the IREDs may also be set based on a value determined from a contrast, etc. of the eyeball image obtained when detecting the line of sight last time.

When setting the CCD-EYE accumulation time and the IRED illumination power, the CPU 100 flashes the IREDs with predetermined power through the IRED drive circuit 107. Simultaneously, the line-of-sight detection circuit 101 starts the accumulation of the CCD-EYE (#206). Besides, the accumulation of the CCD-EYE is finished according to the CCD-EYE accumulation time set previously. With this action, the IREDs are extinguished (#206). If not in the calibration mode (#207), a CCD-EYE read-out area is set (#208). A CCD-EYE read-out area is set based on the CCD-EYE read-out area when detecting the line of sight last time, excepting the first line-of-sight detection after switching ON the power supply of the camera body. However, when the camera position changes, or if the spectacles existence or non-existence condition varies, the CCD-EYE read-out area is set in all of the areas. When the CCD-EYE read-out area is set, the reading action by the CCD-EYE is executed (#209). Conducted at this time is nonprocess-reading from the areas other than the read-out area, thus actually skipping over these areas. An output of the image read by the CCD-EYE is A/D converted by the line-of-sight detection circuit 101 and thereafter stored in the memory of the CPU 100. The CPU 100 performs calculations for sampling the respective characteristic points of the eyeball image (#210). More specifically, in the CPU 100, there are detected positions (xd', yd'), (xe', ye') of Purkinje images defined as virtual images of a set of IREDs employed for illuminating the eyeball. The Purkinje image appears as a luminescent spot exhibiting a high light intensity. Hence, a predetermined threshold value with respect to the light intensity is prepared, and the spot having a light intensity exceeding the threshold value is set as the Purkinje image. The positions of the Purkinje images are thereby detectable. Further, a calculation of a pupil center position (xc', yc') involves detecting a plurality of boundary points between a pupil 19 and an iris 17 and performing the least squares approximation of a circle on the basis of the respective boundary points. At this time, a pupil diameter rp is also calculated. In addition, an interval of the two Purkinje images is calculated from the positions thereof.

The CPU 100 analyzes the eyeball image and, at the same time, detects a contacts of the eyeball image. The CPU 100 resets the CCD-EYE accumulation time from a degree of the contrast. Further, the CCD-EYE read-out area is set from the Purkinje image positions and the pupil position. At this time, the CCD-EYE read-out area is set within a range including the detected pupil, wherein the whole pupil is detectable even when the pupil position shifts by a predetermined quantity. Then, a size thereof is, as a matter of course, smaller than a size of the iris. The CCD-EYE read-out area is set as a rectangle, and coordinates of two diagonal points of the rectangle are stored as the CCD-EYE read-out area in the line-of-sight detection circuit 101. Further, the reliability on the calculated Purkinje positions and pupil center position are judged from the eyeball image contrast or the size of the pupil.

After finishing the analysis of the eyeball image, the line-of-sight detection circuit 101 serving as a means for confirming the calibration data judges whether or not the spectacles information in the calibration data is correct on the basis of the calculated interval between the Purkinje images and the combination of the IREDs flashed (#211). This measure is taken for the photographer who uses or does not use the spectacles the case may be. That is, the photographer's spectacles information in the calibration data is set to, e.g., use the spectacles, and the IREDs 13c, 13d among those shown in FIG. 2B are flashed. In this case, if the Purkinje image interval is larger than a predetermined magnitude, the photographer is recognized as the one who wears spectacles. The spectacles information is thus judged correct. Whereas if the Purkinje image interval is smaller than the predetermined magnitude, it is recognized that the eyes of the photographer are naked or fitted with contact lenses. The spectacles information is thus judged incorrect. If the spectacles information is judged incorrect (#211), the line-of-sight detection circuit 101 changes the spectacle information (#217) and reselects the IREDs (#204) to detect the line of sight. When changing the spectacles information, however, the spectacles information stored in the EEPROM of the CPU 100 is not changed.

Further, if the spectacles information is judged correct (#212), a distance between the eyepiece 11 and the photographer's eyeball 15 is calculated based on the Purkinje image interval. Moreover, from the distance between the eyepiece 11 and the photographer's eyeball 15, an imaging magnification β of the eyeball image projected on the CCD-EYE is calculated (#212). From the calculated values given above, a rotational angle θ of the optical axis of the eyeball 15 is expressed (#213) such as:

$$\theta x \cong ARCSIN \{(xc'-(xp'+\delta x)/\beta/OC\} \quad (1)$$

$$\theta y \cong ARCSIN \{(yc'-(yp'+\delta y)/\beta/OC\} \quad (2)$$

however, $$xp' \cong (xd'+xe')/2$$

$$yp' \cong (yd'+ye')/2$$

where $\delta x$, $\delta y$ are correction terms for correcting the center positions of the two Purkinje images. When the rotational angles $\theta x$, $\theta y$ of the photographer's eyeballs are obtained, a line-of-sight position (x, y) on the focusing screen 7 is given by:

$$x \cong m*ax*(\theta x'bx) \quad (3)$$

$$y \cong m*ax*(\theta y+by) \quad (4)$$

where ax, bx, by are parameters for correcting an individual difference in the line of sight, but ax is the calibration data. Further, bx corresponding to a correction quantity of the eyeball between the optical axis and the visual axis in the horizontal direction (x-direction) is the function of the pupil diameter rp and expressed by:

$$bx=kx*(rp-rx)+b0x \quad (5)$$

where rx is the constant, and b0x is the calibration data. Further, in the formula (5), the proportional coefficient kx relative to the pupil diameter rp takes a value which differs depending on the size of the pupil and is set such as:

when $rp \geq rx$, $kx=0$, and when $rp<rx$, $kx=\{1-k0*k1*(\theta x+bx')/|k0|\}*k0 \quad (6)$ Namely, the proportional coefficient kx takes a value 0, if the pupil diameter rp is equal to or larger than a predetermined pupil size rx. Whereas if smaller than the predetermined pupil size rx, kx is the function of the rotational angle $\theta x$ of the eyeball optical axis. Further, bx' corresponds to a correction quantity of the visual axis when the photographer sees substantially the center of the finder and is given by:

$$bx'=k0*(rp-rx)+b0x$$

where k0 is the calibration data and represents a rate of variation in the correction quantity bx of the visual axis with respect to the variation in the pupil diameter rp when the photographer sees substantially the center of the finder, and k1 is the predetermined constant.

The parameter by corresponding to the correction quantity in the vertical direction (y-direction) and defined as the function of the pupil diameter rp is given by:

$$by=ky*rp+b0y \quad (7)$$

where ky, b0y are the calibration data.

Further, the reliability on the line-of-sight coordinates calculated by use of the formulae (3)–(7) is changed according to the reliability on the line-of-sight calibration data.

When the line-of-sight coordinates on the focusing screen 7 are obtained, there is set a flag indicating that the line-of-sight detection is performed once (#215), and the action returns to the main routine (#218).

The flowcharts of FIGS. 7 and 8 showing the line-of-sight detection are also effective in the line-of-sight calibration mode. In step #201, it is judged that the line of sight is detected in the calibration mode. Judged next is whether or not the line-of-sight detection conducted this time is the first one in the calibration mode (#216). When judging that the line-of-sight detection of this time is the first one in the calibration mode, an ambient brightness is measured for setting the CCD-EYE accumulation time and the IRED illumination power (#203). Actions after this step are as explained earlier. Further, if the line-of-sight detection of this time is judged to be more than the second one in the calibration mode (#216), the CCD-EYE accumulation time and the IRED illumination power take the values of the last time, thereby immediately starting flashing the IREDs and CCD-EYE accumulation (#206). Besides, if in the line-of-sight calibration mode, and when the line-of-sight detection is more than the second one (#207), the CCD-EYE read-out area involves the use of the same area as that of last time. Therefore, the CCD-EYE reading action is executed immediately when finishing the CCD-EYE accumulation (#209). Actions after this step are as stated before.

Referring to the flowcharts of FIGS. 7 and 8 showing the line-of-sight detection, the variables when returning to the main routine are the line-of-sight coordinates (x, y) on the focusing screen in the case of the normal line-of-sight detection. In the case of detecting the line of sight in the line-of-sight calibration mode, the variables are the rotational angles ($\theta x$, $\theta y$) of the photographer's eyeball optical axis. Further, other variables, i.e., the reliability on the detected result, the CCD-EYE accumulation time and the CCD-EYE read-out area are common. Additionally, in accordance with this embodiment, the photometric information detected by the photometric sensor 10 of the camera is employed for setting the CCD-EYE accumulation time and the IRED illumination power. It is also, however, effective to newly provide means for detecting a brightness of a front face of the photographer in the vicinity of the eyepiece 11.

Next, the photometric calculation will be explained referring to FIG. 9.

In STEP 10, there are taken in digital signals D0–D15 corresponding to 16-subarea luminances outputted from the photometric sensors $S_0$–$S_{15}$.

STEP 11 is to take in pieces of intrinsic-to-lens information such as an open F-number, a focal length, an outgoing pupil position and a drop in marginal lumination when in an aperture open state with respect to the photographing lens mounted.

Correction values $\theta 0$–$\theta 15$ corresponding to the sixteen output signals outputted from the sensors $S_0$–$S_{15}$ are determined based on the intrinsic-to-lens information of STEP 11. The corrections are applied to the digital signals D0–D15 taken in according to STEP 10, thereby determining the luminances. Of the thus determined luminance signals, a luminance signal $V_0$ corresponds to the subarea $S_0$, $V_1$ corresponds to $S_1$, $V_2$ corresponds to $S_2$, . . . and $V_{15}$ corresponds to $V_{15}$.

STEP 13 relates to an AF switch and is to judge which focus detection point to select among the focus detection points 200–204 in accordance with the line-of-sight information.

In STEP 14, 16-partitioned subareas $S_0$–$S_{15}$ are classified into three groups of intermediate areas, i.e., the intermediate area including the selected focus detection point, the intermediate area peripheral thereto and the intermediate area further peripheral thereto. An average luminance of each intermediate area is calculated and then outputted. In connection with average luminance signals of respective intermediate areas, it is assumed that a signal A is outputted as an average luminance signal of the intermediate area including the focus detection point; a signal B is outputted as an average luminance signal of the intermediate area peripheral thereto; and a signal C is outputted as an average luminance signal of the intermediate area further peripheral thereto.

For instance, when the leftmost detection point 200 is selected in STEP 13, the average luminance signals A, B, C of the respective intermediate areas are outputted based on the following equations:

$$A=V3$$

$$B=(V1+V8+V9)/3$$

$$C=(V0+V2+V4+V5+V6+V7+V10+V11+3(V12+V13+V14+V15))/20$$

When the second detection point 201 from the left end is selected in STEP 13, the average luminance signals A, B, C of the respective intermediate areas are outputted based on the following equations:

$$A=V1$$

$$B=(V0+V3+V6)/3$$

$$C=(V2+V4+V5+V7+V8+V9+V10+V11+3\ (V12+V13+V14+V15))/20$$

When the center detection point 202 is selected in STEP 13, the average luminance signals A, B, C of the respective intermediate areas are outputted based on the following equations:

$$A=V0$$

$$B=(V1+V2+V5)/3$$

$$C=(V3+V4+V6+V7+V8+V9+V10+V11+3(V12+V13+V14+V15))/20$$

When the second detection point 203 from the right end is selected in STEP 13, the average luminance signals A, B, C of the respective intermediate areas are outputted based on the following equations:

$$A=V2$$

$$B=(V0+V4+V7)/3$$

$$C=(V1+V3+V5+V6+V8+V9+V10+V11+3(V12+V13+V14+V15))/20$$

When the rightmost detection point 204 is selected in STEP 13, the average luminance signals A, B, C of the respective intermediate areas are outputted based on the following equations:

$$A=V4$$

$$B=(V0+V10+V11)/3$$

$$C=(V0+V1+V3+V5+V6+V7+V8+V9+3(V12+V13+V14+V15))/20$$

Whether or not a photometric mode signal MODE is a signal representing evaluation photometry is judged in STEP 15. When MODE=EV (evaluation photometry), the action proceeds to STEP 16. When MODE≠EV, i.e., MODE=PA (spot photometry), the action proceeds to STEP 19.

In STEP 16, the evaluation photometry has been selected as the photometric mode, and, therefore, a calculation of the evaluation photometry is performed. Using all of the three average luminance signals A, B, C obtained in STEP 14, an average luminance signal E0 for weighting substantially the entire picture is obtained by the following equation:

$$E0=(2A+3B+5C)/10$$

In accordance with the above equation, an average value is obtained by multiplying the respective values of A, B, C by a coefficient without simply averaging the three average luminance signals A, B, C. This is intended to correct such evaluation that the area including the focus detection point is considered extremely important if not multiplied by the coefficient. It is because an area ratio of the three areas is given by:

$$S(A):S(B):S(C)=1:3:20$$

where S(A) is the area of the subarea including the focus detection point, S(B) is the area of the intermediate area peripheral thereto, and S(C) is the area further peripheral thereto. Note that the calculation of obtaining E0 in the above equation is referred to as a focus detection point priority photometry in an explanation which follows.

In STEP 17, a photographing condition is analogized, and an exposure correction value α is selectively determined by use of the average luminance signals A, B, C of the areas that are obtained in STEP 14 and difference values B-A, C-B between the average luminance signals. The calculation of the correction values is thus performed.

An auto exposure correction is effected in STEP 18 in such a manner that the correction value α outputted in the correction value selective calculation STEP 17 is added to the above focus detection point priority average photometry E0. A final evaluation photometric value E is obtained by the following equation:

$$E=E0+\alpha$$

In STEP 19, when the photometric mode is defined by MODE≠EV, viz., MODE=PA in STEP 15, the spot photometry is selected as the photometric mode, and hence a calculation of the spot photometry is conducted. The spot photometry involves the use of only the average luminance signal A of the subarea including the focus detection point obtained in STEP 14. This value is outputted directly as the photometric value E. That is, the photometric value E is expressed as follows:

$$E=A$$

This embodiment is constructed such that one subarea including the selected focus detection point is selected as an area including the focus detection point, corresponding to the selection of the focus defection point. Accordingly, the spot photometry is by the subarea luminance signal itself.

Note that the subarea (a specific area as a basis for determining the classification) selected by the line-of-sight information is made coincident with the area of the focus detection point, and, for this purpose, the line-of-sight information is employed only in the X-direction in the embodiment discussed above. It is also, however, effective to purely select the specific area on the basis of the line-of-sight points (X- and Y-directional data) and perform the classification on the basis of this selected area. In this case, it may happen that the focus detection point deviates from the central area (subarea selected by the line-of-sight information) in the photometry in accordance with the embodiment shown in FIG. 3. However, the principal subject area (focus detection point) may be different from the principal photometric area in some cases, and therefore the effectiveness is still exhibited.

According to the embodiment discussed above, the field is partitioned into the plurality of photometric subareas, and the luminances of the partitioned subareas are detected. The classification into the plurality of groups is effected based on the selection of specific subarea among the plurality of subareas. Based on the above classification, the photometric value is calculated by changing the weighting of the luminances of the plurality of subareas. With respect to this calculation, the above specific subarea is selected based on the line-of-sight information of the photographer. Accordingly, the in-field portion can be classified on the basis of the principal photometric area of which the photographer is aware, and the weighting of the subareas changes. It is therefore possible to obtain the photometric value reflecting an intention of the photographer and taking the entire field into consideration.

Next, a second embodiment will be described.

The second embodiment involves such an arrangement wherein a flash element and a detecting element are added to the construction of the first embodiment described above. The following discussion gives a difference (addition) from the explanation of the first embodiment. An explanation of other portions common to the first embodiment will be omitted.

Figure 10:
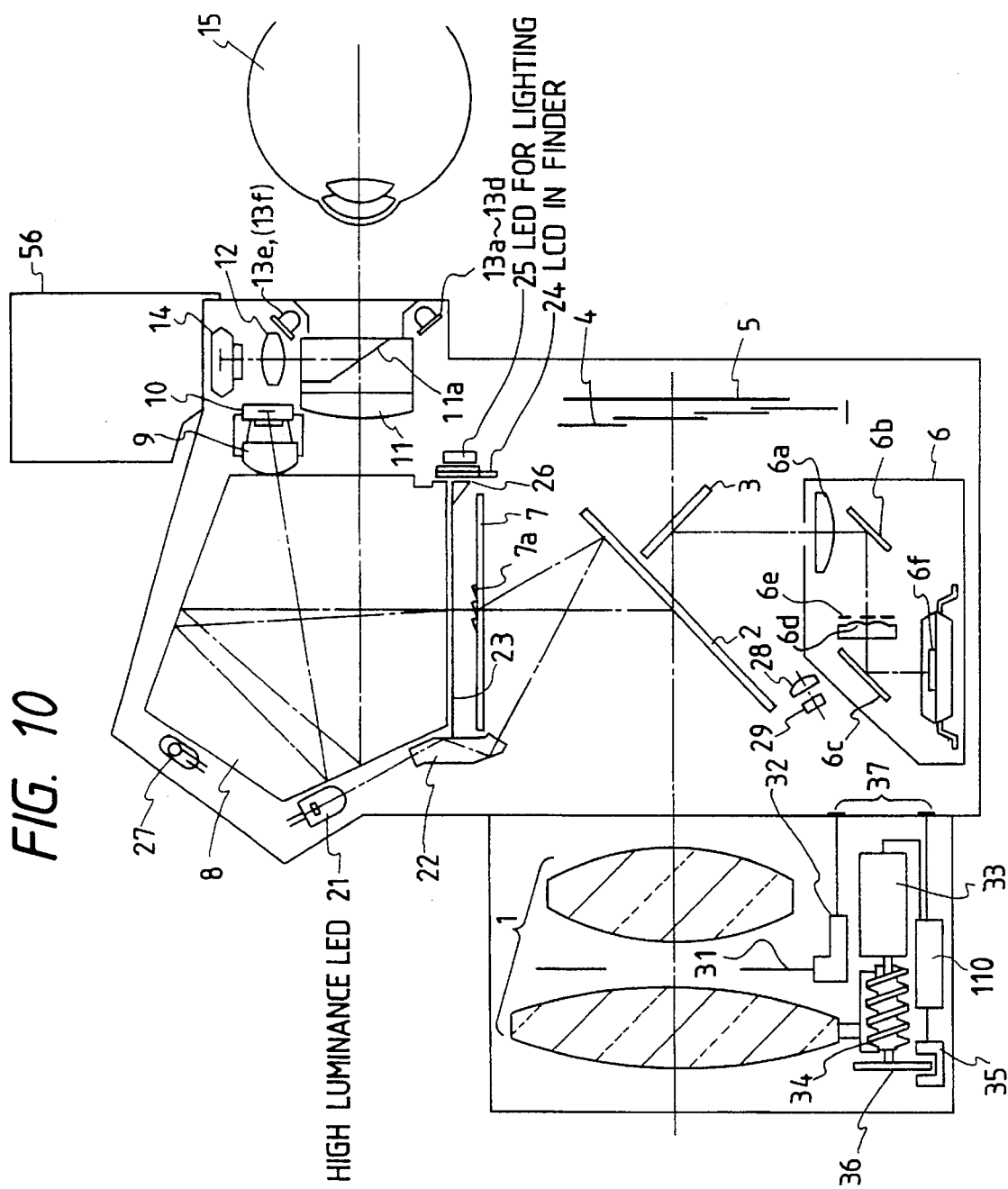
FIG. 10 is a schematic view illustrating a single-lens reflex camera in a second embodiment.

Turning to FIG. 10, the numeral 29 designates a detecting sensor. A detecting imaging lens 28 serves to project a subject image on the film surface 5 upon the detecting sensor 29. Further, the numeral 56 represents a built-in or attachable/detachable stroboscope.

Figure 11:
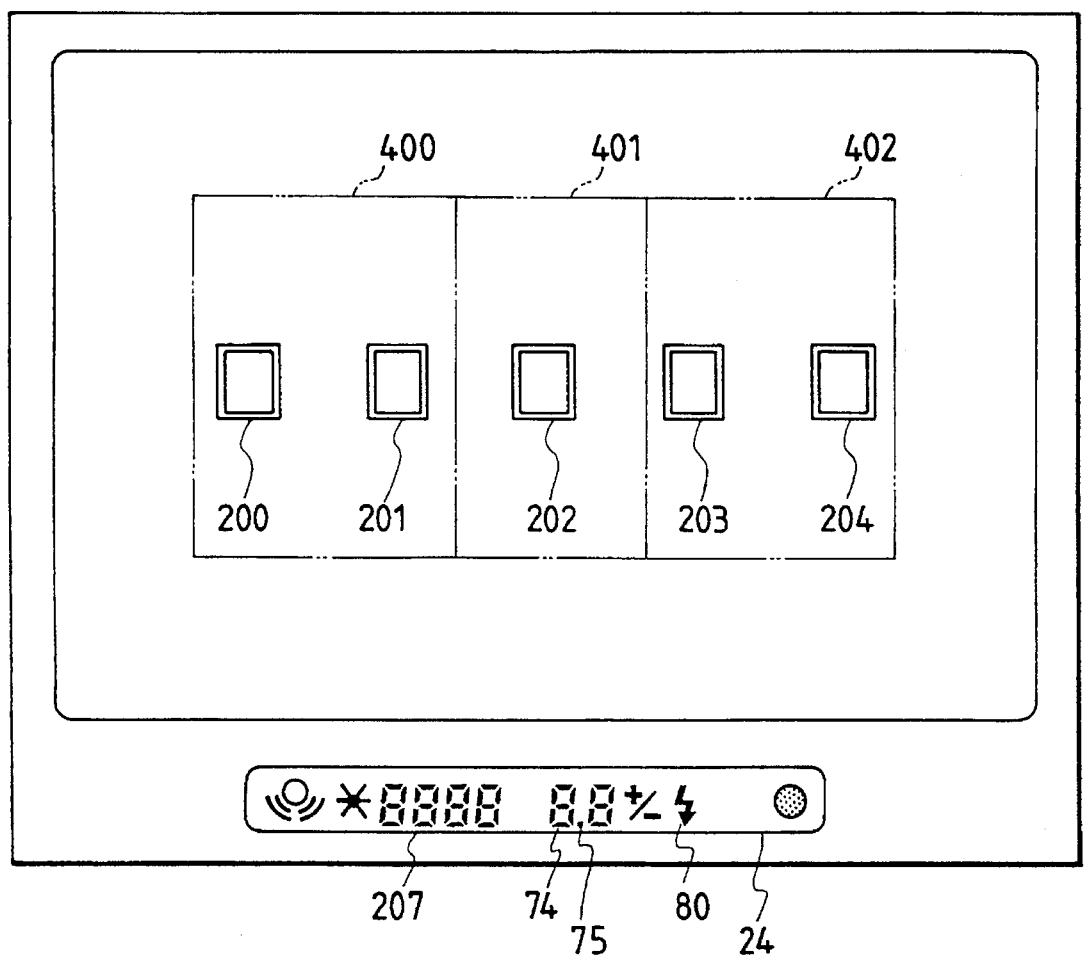
FIG. 11 is a view showing a field of a finder in the second embodiment.

FIG. 11 shows a configuration in which the detecting sensor 29 shown in FIG. 10 is projected on the camera finder. As illustrated in the FIGURE, the detecting sensor 29 is a 3-partitioned sensor. Accordingly, a photometric sensitivity region of the detecting sensor 29 in the finder is partitioned into three areas, i.e., an area 400 including detection points 200, 201, an area 401 including a detection point 202 and an area 402 including detection points 203, 204.

Figure 12:
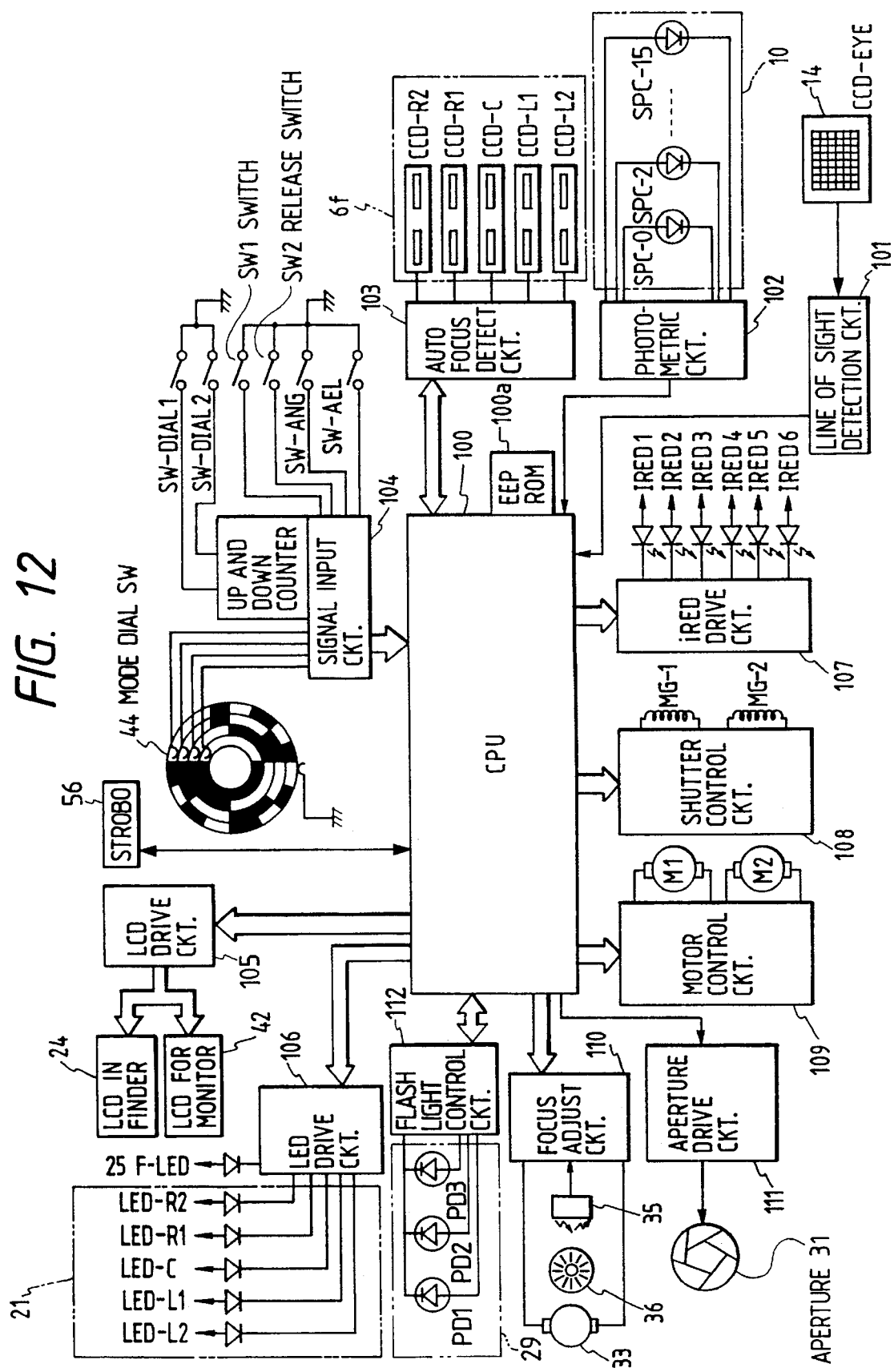
FIG. 12 is a diagram showing an electric circuit of the camera in the second embodiment.

FIG. 12 is an electric circuit diagram. Referring to FIG. 12, a detecting circuit 112 performs, when a stroboscope emits a flash of light, a logarithmic compression amplification and an integration on an optical current given from the detecting sensor 29 consisting of three sensitive portions PD1, PD2, PD3 under MPU signals. If over a predetermined value, the signal is transmitted to the MPU to stop the flash of the stroboscope 56, thus effecting the detecting process.

Figure 13B:
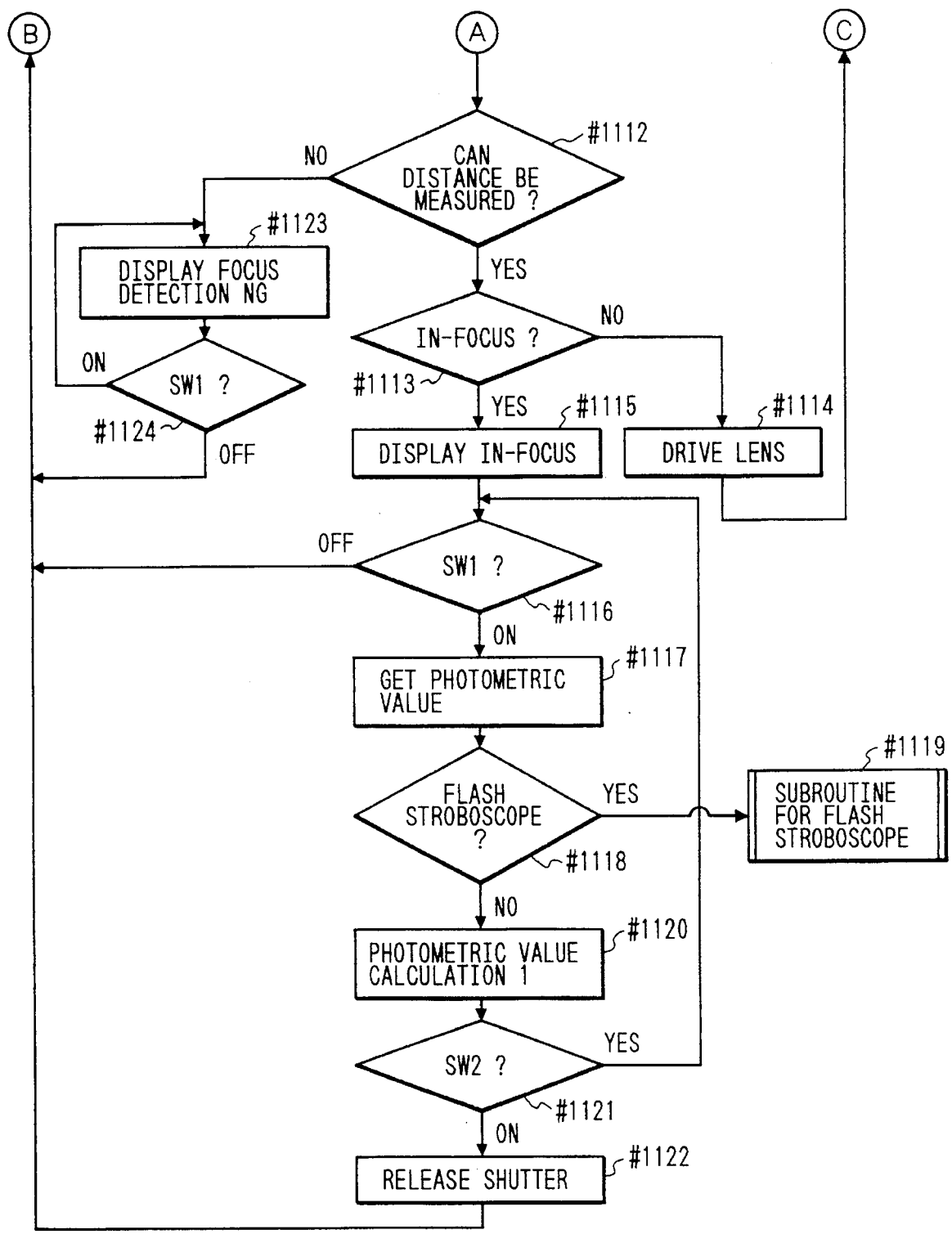
FIG. 13, which consists of FIGS. 13A and 13B, is a flowchart showing actions of the camera in the second embodiment.

Next, FIG. 13 shows the operations of the camera incorporating the line-of-sight detecting apparatus. In-finder display states at that time will hereinafter be explained with reference to FIG. 3.

When setting the camera in a predetermined photographing mode from a non-active status by rotating a mode dial 44 (an explanation will be given based on the case of being set to the shutter priority AE in this embodiment), the power supply of the camera is switched ON (#1100). Reset are variables used for detecting the line of sight except the line-of-sight calibration data stored in the EEPROM 100a of the CPU 100 (#1101). Then, the camera waits till the switch SW1 is turned ON after depressing the release button 41 (#1102). The signal input circuit 104 detects that the switch SW1 is turned ON with the depression of the release button 41. Then, the CPU 100 checks whether or not the camera is in the photographing mode using the stroboscope, e.g., an auto-program mode (the shutter speed and the F-number are automatically determined by the camera), or whether in a such state that an external stroboscope is mounted or not (#1103). If not in the stroboscope mode, the action proceeds to #1106. Whereas if in the stroboscope mode, a charge of a capacitor for flashing of the stroboscope is started (#1104). After completing the charge (#1105), the action proceeds to #1106. The line-of-sight detection circuit 101 confirms which calibration data to use when the CPU detects the line of sight in #1106. If the calibration data of the calibration data number confirmed at this time remains to be an initial value but is not changed or set in a line-of-sight prohibition mode (#1106), the line-of-sight detection is not executed. That is, a specific detection point is selected by a detection point auto-selection subroutine without using the line-of-sight information (#1108). The focus detection circuit 103 at this focus detection point performs a focus detecting action (#1111). Some methods can be considered as an algorithm for automatically selecting the detection point. The effective algorithm is, however, a near point priority algorithm known in the multipoint AF camera, wherein the central focus detection point is weighted.

Further, when the line-of-sight calibration data is set in a predetermined calibration data number, and if it is recognized that the data is inputted by the photographer, the line-of-sight detection circuit 101 executes the line-of-sight detection in accordance with the data (#1107). Note that the action of STEP 1107 is shown in detail in FIG. 8. At this time, the LED drive circuit 106 flashes the flash LED (F-LED) 22 The LCD drive circuit 105 flashes a line-of-sight input mark 78 of the in-finder LCD 24. The photographer can thus confirm a state where the camera is detecting the line of sight through an out-of-finder-picture portion 207. Note that the line of sight detected by the line-of-sight detection circuit 101 is transformed into target position coordinates on the focusing screen 7.

The CPU 100, after selecting the detection point, transmits the signal to a display circuit 106. The above detection point mark is flash-displayed by use of the superimpose LED 21 (#1109). Besides, at this time, a detection point different from the intention of the photographer is flashed due to a deterioration in terms of detection accuracy of the target position coordinates detected by the line-of-sight detection circuit 101. In this case, the CPU 100 recognizes that the detection point selected from the line of sight of the photographer is incorrect. The photographer therefore separates his hand from the release button 41, thereby turning OFF the switch SW1 (#1110). Then, the camera waits till the switch SW1 is turned ON (#1102).

Further, the photographer sees the detection point displayed, which point is selected from the line of sight. If the photographer consecutively keeps ON the switch SW1 (#1116), the focus detection circuit 103 detects a focal point by employing the line sensor corresponding to the selected detection point (#1111). Herein, whether the selected detection point is incapable of detecting the focal point or not is judged (#1113). If incapable, the CPU 100 transmits the signal to the LCD drive circuit 105 to flash the in-focus mark 79 of the in-finder LCD 24. An alarm saying that the focus detection is NG is thus given to the photographer (#1123). This continues till the switch SW1 is separated (#1124). If capable of detecting the focal point, and when a focus adjusting state of the detection point selected by the predetermined algorithm is not an in-focus state (#1113), the CPU 100 transmits the signal to a lens focus adjusting circuit 110, thereby driving the photographing lens 1 by a predetermined quantity (#1114). After driving the lens, the autofocus detection circuit 103 again detects the focal point (#1111). Whether or not the photographing lens 1 is in focus is judged (#1113). If the photographing lens is in focus at the selected detection point, the CPU 100 transmits the signal to the LCD drive circuit 105, thereby flashing the in-focus mark 79 of the in-finder LCD 24. The CPU 100 simultaneously transmits the signal to the LED drive circuit 106, whereby in-focus displaying is effected through the in-focus detection point mark (#1115). At this time, the flash-display of the detection point mark selected from the line of sight described above is set in the flash state when in focus for causing the photographer to make a recognition of being focalized. The photographer sees the in-focus detection point displayed in the finder and recognizes that the detection point is incorrect in terms of position. The photographer then separates his hand from the release button 41, thereby turning OFF the switch SW1 (#1116). Consecutively, the camera waits till the switch SW1 is turned ON (#1102). Further, the photographer sees the detection point in-focus displayed and consecutively keeps ON the switch SW1 (#1116). In this case, the CPU 100 transmits the signal to the photometric circuit 102 and causes the same circuit to take in a photometric value (#1117). Herein, a photometric value 4 taken in is such a luminance signal that the correction is made (based on the intrinsic-to-lens information such as an open F-number, a focal length, an outgoing pupil position and a drop in marginal lumination when in an open aperture with respect to the photographing lens) in the signals corresponding to the 16-subarea luminances outputted from the subareas S0–S15 of the photometric sensor. In the determined luminance signals, the luminance signal V0 corresponds to the subarea S0, the luminance signal V2 corresponds to S2, . . . and V15 corresponds to S15.

Next, whether or not the stroboscope is flashed is judged in #1118. The following is a condition for this judgement. If this condition is satisfied, the flash of the stroboscope is determined, and the action shifts to a stroboscope flash subroutine of #1119 which will be stated later.

A luminance of the photometric area including the detection point determined in #1111 is set as a luminance signal Va (any one of V0 to V4) among the luminance signals V0 to V15 of the 16 subareas $S_0$ to $S_{15}$ of the photographing field which have been taken in according to #1117. The luminance signal having the maximum luminance among the luminance signals V0 to V15 is expressed by Vmax. If a between-the-two-signal luminance difference: Vdef= Vmax–Va exists in a hatched region shown in FIG. 15, it is judged that there is a necessity for the flash of the stroboscope.

Figure 15:
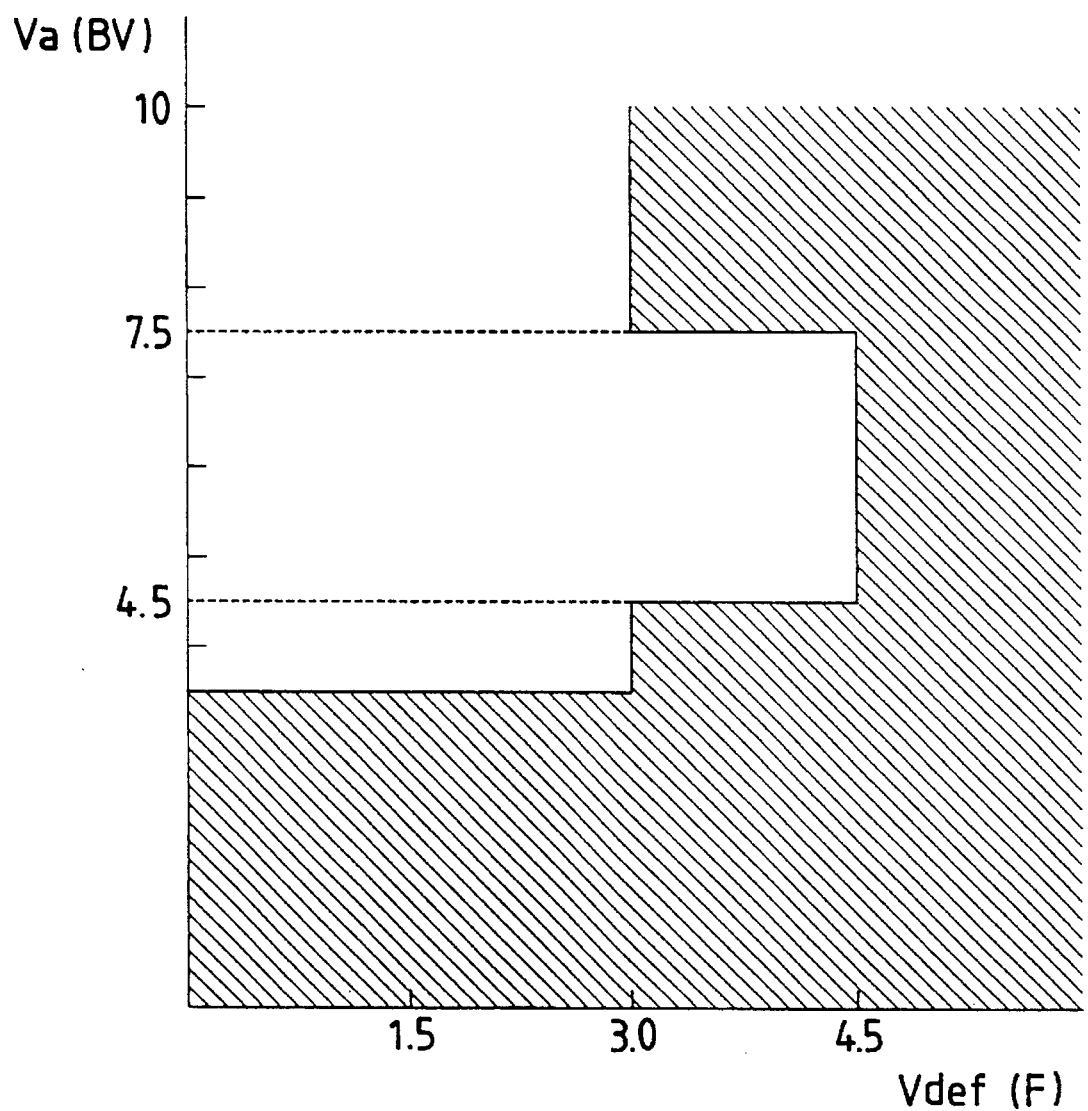
FIG. 15 is an explanatory diagram showing how the stroboscope flash is judged.

Turning to FIG. 15, the axis of ordinate indicates the luminance Va including the detection point selected in #1111, while the axis of abscissa indicates the difference Vdef between Va and the maximum luminance Vmax in the photometric subareas of the photographing field. The flash of the stroboscope is needed in the hatched region but is not needed in a non-hatched region. Namely, this is a region where the exposure is controlled by a photometric value calculation 2 which will hereinafter be stated. According to a concept of this flash condition, it is judged that there is the necessity for the flash of the stroboscope if a luminance difference between the principal subject and its background is large when the principal subject is considerably or slightly dark.

Whereas if the stroboscope flash condition is not satisfied, a photometric value calculation 1 is effected by use of the 16-subarea luminance values V0–V15 taken in #1117 (#1129).

The classification of all of the subareas $S_0$ to $S_{15}$ is performed based on the photometric subareas $S_0$ to $S_4$ including the in-focus detection point at that moment. Effected is the evaluation photometric calculation in which weighting of each area is carried out according to this classification. An exposure value is thus determined. Further, whether or not the switch SW2 is turned ON by depressing the release button 41 is judged (#1121). If the switch SW2 is in the OFF-state, the state of the switch SW1 is again confirmed (#1116). When turning ON the switch SW2, the CPU 100 transmits the signals to the shutter control circuit 108, the motor control circuit 109 and the aperture drive circuit 111, respectively. At the first onset, the M2 is energized, whereby the principal mirror 2 flips up. The aperture 31 is stopped down, and, thereafter, the MG1 is energized to open the front blade-set of the shutter 4. An F-number of the aperture 31 and a shutter speed of the shutter 4 are determined from a sensitivity of the film 5 as well as from an exposure value detected by the photometric circuit 102. After a predetermined shutter time (1/250 sec) has elapsed, the MG2 is energized, thereby closing the rear blade-set of the shutter 4. When finishing the exposure on the film 5, M2 is again energized. Then, the mirror flips down, and the shutter charge takes place. Simultaneously, M1 is also energized to feed the film frames. A series of actions of the shutter release sequence are ended (#1123). Thereafter, the camera waits till the switch SW1 is again turned ON (#1102).

Figure 14:
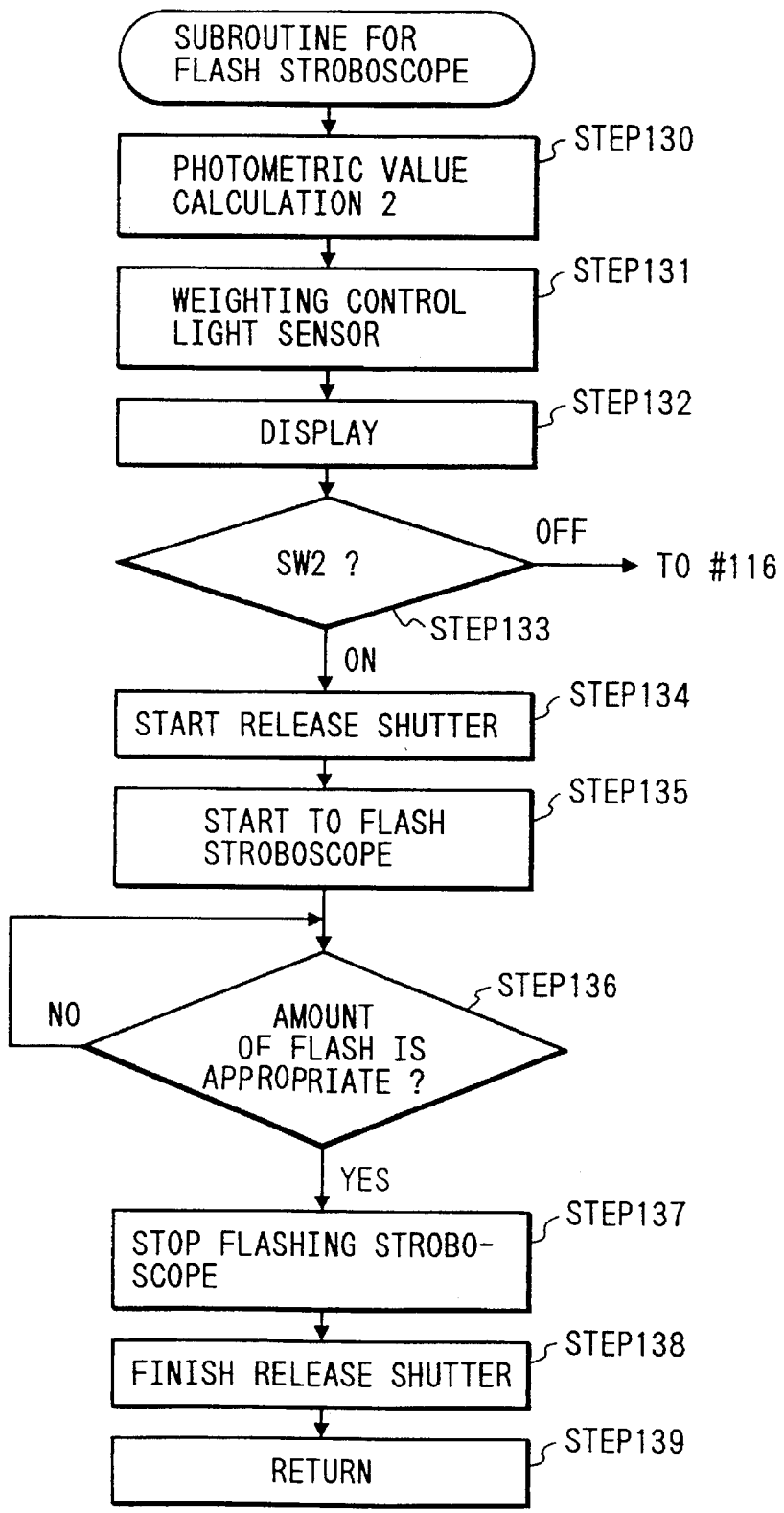
FIG. 14 is a flowchart showing a stroboscope flash subroutine.

Next, the stroboscope flash subroutine (#1119) will be explained with reference to FIG. 14. In STEP 130, the photometric value calculation 2 is executed. This is substantially the same as the above photometric value calculation in the first embodiment. However, a photometric value which will be finally obtained is the above-mentioned focus detection point priority average photometric value. The calculation for obtaining the exposure correction value a and the selection of the spot photometry mode are not carried out. That is, the calculation is all done by the following formula:

$$E=(2A+3B+5C)/10$$

Corresponding to the focus detection points selected in #1111, weighting is effected on photoelectric conversion outputs D0(t), D1(t), D2(t), defined as functions of a time t, of the photometric sensitive areas 400, 401, 402 corresponding to the detecting sensors PD1, PD2, PD3 in STEP 131. More specifically, G0●D0(t), G1●D1(t), G2●D2(t) are obtained by multiplying the photometric conversion outputs D0(t), D1(t), D2(t) by gains G0, G1, G2, respectively. Three outputs of G0●D0(t), G1●D1(t), G2●D2(t) are compared with a threshold value. When any one of these three outputs reaches the threshold value, the flash of the stroboscope is stopped. As a matter of fact, when the leftmost focus detection point 200 and the second focus detection point from the left end are respectively selected in #1115, G0=1, G1=0.5, and G2=0.5. When the central focus detection point 202 is selected, G0=0.5, G1=1.0, and G2=0.5. Further, when the second focus detection point 203 from the right end and the rightmost focus detection point 204 are selected, G0=0.5, G1=0.5, and G2=1.0. In any case, the detecting process is conducted by giving the priority to the photometric sensitive area including the focus detection point.

In STEP 132, as shown in FIG. 3, a stroboscope incomplete mark 80 and the photometric value obtained in STEP 130 are displayed in the display portions 207, 74, 75 on the in-finder LCD 24.

Judged in STEP 133 is whether or not the switch SW2 is turned ON. If turned ON, the action proceeds to step 134. Whereas if the switch SW2 is turned OFF, the camera waits till the switch SW1 is again turned ON.

In STEP 134, when the switch SW2 is turned ON, the CPU 100 causes the main mirror to flip up and controls the lens aperture 31, thus opening the front blade-set of the shutter 4.

In STEP 135, the signals to open the front blade-set of the shutter 4 in STEP 134 are triggered to start the flash of the stroboscope.

In STEP 136, the photoelectric conversion outputs G0●D0(t), G1●D1(t), G2●D2(t) of the detecting sensor which have been weighted corresponding to the focus detection points in STEP 131 are compared with the threshold value. The detecting circuit 112 continues the integration of the light quantity till any one of these three outputs reaches the threshold value. When reaching the threshold value, the action goes forward to STEP 137, the CPU 100 stops the flash of the stroboscope.

In STEP 137, the rear blade-set of the shutter is closed after a predetermined time has elapsed. The exposure is thereby ended.

Furthermore, with an end of a mechanical sequence such as the mirror-down, etc., the action returns to the switch SW1 wait status in the main routine in STEP 139.

In accordance with the embodiment discussed above, the luminance of the specific subarea selected from the line-of-sight information is compared with the maximum luminance in other subareas. This way of thinking is effective as a result of examination based on a variety of actual scenes. As another way of thinking, however, it is also effective to compare the above luminance of the specific subarea with luminances of the peripheral subareas.

In the second embodiment discussed above, the field is partitioned into the plurality of subareas. The luminances of the subareas are detected. The specific subarea is selected from the plurality of subareas on the basis of the line-of-sight information. The luminance of the specific subarea is compared with the luminances of other subareas. The necessity for the emission of the flash is judged based on this comparative information. It is therefore possible to distinguish the back light of the principal subject to exactly reflect the intention of the photographer.

Further, according to the second embodiment, there is provided the detecting means including the plurality of detecting sensors corresponding to the plurality of focus detection areas. The plurality of detecting sensors are the first detecting sensor for detecting one focus detection area and the second detecting sensors for detecting the plurality of focus detection areas all together. The flash quantity can be thereby controlled with high accuracy, taking the principal subject into consideration. Besides, it is possible to provide the camera which is not particularly required to increase in size.

It is apparent that, in this invention, a wide range of different working modes can be formed based on the invention without deviating from the spirit and scope of the invention. This invention is not restricted by its specific working modes except being limited by the appended claims.

What is claimed is:

1. A camera comprising:

a line-of-sight detecting device for detecting a line of sight of an observer;

photometric means for detecting luminances of a plurality of subareas into which a luminance detection area is partitioned;

selecting means for selecting a specific subarea from the plurality of subareas on the basis of information regarding the line of sight detected by said light-of-sight detecting device;

first generating means for generating first luminance data regarding the specific subarea selected by said selecting means;

second generating means for generating second luminance data regarding a group of subareas composed of a plurality of subareas excluding the specific subarea;

weighting means for weighting the first luminance data and the second luminance data and for producing a corresponding output; and correcting means for correcting the output of said weighting means on the basis of a difference between the first luminance data and the second luminance data.

2. A camera according to claim 1, wherein said line-of-sight detecting device detects the line of sight on the basis of an eyeball image of the observer.

3. A camera according to claim 1, wherein said selecting means selects a subarea corresponding to the line of sight as the specific subarea.

4. A camera according to claim 1, wherein said calculating means classifies the plurality of subareas with the specific subarea being centered, averages the luminances of a classified intermediate area and weights the averaged luminance of the intermediate area.

5. A camera according to claim 1, wherein said calculating means increases weighting of the specific subarea.

6. A camera comprising:

a line-of-sight detecting device for detecting a line of sight of an observer;

photometric means for detecting luminances of n subareas into which a luminance detection area is partitioned;

focus detecting means for detecting m focus detection areas, wherein n>m, and wherein there exists a subarea including a particular focus detection area and a subarea not including the particular focus detection area;

selecting means for selecting a specific subarea from the n subareas on the basis of information regarding the line of sight detected by said line-of-sight detecting device and, at the same time, selecting at least one of the m focus detection areas, the specific subarea including the selected at least one focus detection area; and calculating means for weighting the luminances of the n subareas on the basis of the specific subarea selected by said selecting means.

7. A camera according to claim 6, wherein said line-of-sight detecting device detects the line of sight on the basis of an eyeball image of said observer.

8. A camera according to claim 6, further comprising a focusing mechanism for effecting a focusing action on the basis of focus detection information in the selected at least one focus detection area.

9. A camera comprising:

a line-of-sight detecting device for detecting a line of sight of an observer;

photometric means for detecting luminances of a plurality of subareas into which a luminance detection area is partitioned;

selecting means for selecting a specific subarea from the plurality of subareas on the basis of information on the line of sight detected by said line-of-sight detecting device; and judging means for judging, when comparing a luminance of the specific subarea selected by said selecting means with luminances of the other subareas, a necessity for an emission of a flash of light on the basis of comparative information thereof.

10. A camera according to claim 9, wherein said line-of-sight detecting device detects the line of sight on the basis of an eyeball image of the observer.

11. A camera according to claim 9, wherein said selecting means selects a subarea corresponding to the line of sight as the specific subarea.

12. A camera according to claim 9, wherein said judging means compares the luminance of the specific subarea with a maximum luminance in the other subareas.

13. A camera comprising:

a line-of-sight detecting device for detecting a line of sight of an observer;

photometric means for detecting luminances of n subareas into which a luminance detection area is partitioned;

focus detecting means for detecting m focus detection areas located in the n subareas, wherein n>m, and wherein there exists a subarea including a particular focus detection area and a subarea not including the particular focus detection area;

selecting means for selecting a specific subarea from the n subareas on the basis of information regarding the line of sight detected by said line-of-sight detecting device and, at the same time, selecting at least one of the m focus detection areas, the specific subarea including the selected at least one focus detection area; and judging means for judging, when comparing the luminance of the specific subarea selected by said selecting means with the luminances of the other subareas, a necessity for an emission of a flash of light on the basis of comparative information thereof.

14. A camera according to claim 13, wherein said line-of-sight detecting device detects the line of sight on the basis of an eyeball image of the observer.

15. A camera according to claim 13, wherein said judging means compares the luminance of the specific subarea with a maximum luminance in the other subareas.

16. A camera according to claim 13, further comprising a focusing mechanism for effecting a focusing action on the basis of focus detection information in the selected at least one focus detection area.

17. A camera according to claim 13, further comprising calculating means for weighting the luminances of the n subareas on the basis of the specific subarea selected by said selecting means.

18. A camera comprising:

focus detecting means for detecting a plurality of focus detection areas;

flash means;

detection means for detecting a beam of light emitted from said flash means and reflected from a subject, said detection means comprising a first detection sensor for detection substantially in one area of the plurality of focus detection areas and a second detection sensor for detection substantially in a plurality of focus detection areas among the plurality of focus detection areas; and control means for controlling a quantity of light emitted by said flash means on the basis of an output of said detection means.

19. A camera according to claim 18, wherein said first detection sensor and said second detection sensor receive light reflected from a film surface.

20. A camera according to claim 18, wherein said first detection sensor effects detection in a focus detection area located in a central position, and said second detection sensor effects detection in a plurality of focus detection areas located in peripheral positions.

21. A camera according to claim 18, further comprising line-of-sight detecting means for detecting a line of sight of an observer.

22. A camera according to claim 21, wherein said first detection sensor detects in substantially one area in accordance with information on the line of sight detected by said line of sight detecting means, and wherein said control means controls a quantity of light emitted by said flash means on the basis of an output of said first detection sensor.

23. A camera comprising:

a line-of-sight detecting device for detecting a line of sight of an observer;

photometric means for detecting luminances of a plurality of subareas into which a luminance detection area is partitioned;

selecting means for selecting a specific subarea from the plurality of subareas on the basis of information regarding the line of sight detected by said line-of-sight detecting device;

first generating means for generating first luminance data regarding the specific subarea selected by said selecting means;

second generating means for generating second luminance data regarding a group of subareas composed of a plurality of subareas excluding the specific subarea;

weighting means for weighting the first luminance data and the second luminance data and for producing a corresponding output; and correcting means for correcting the output of said weighting means on the basis of a comparison between the first luminance data and the second luminance data.

24. A camera according to claim 23, wherein said line-of-sight detecting means detects said line of sight on the basis of an eyeball image of said observer.

25. A camera according to claim 23, wherein said selecting means selects the subarea corresponding to said line of sight as said specific subarea.

26. A camera according to claim 23, wherein said calculating means classifies said plurality of subareas with said specific subarea being centered, averages the luminances of an intermediate area so classified, and weights the averaged luminance of said intermediate area.

27. A camera according to claim 23, wherein said calculating means increases weighting on said specific areas.

* * * * *

UNITED STATES PATENT AND TRADEMARK OFFICE
CERTIFICATE OF CORRECTION

PATENT NO. : 5,579,080
DATED : November 26, 1996
INVENTOR(S) : YOSHIAKI IRIE, ET AL.

It is certified that error appears in the above-indentified patent and that said Letters Patent is hereby corrected as shown below:

COLUMN 4

Line 35, "displayed" should read --displayed in--.

COLUMN 6

Line 19, "according" should read --according to--.

COLUMN 7

Line 12, "which," should read --which--.

COLUMN 10

Line 19, "a" should be deleted.
Line 42, "spectacles" should read --spectacles as--.
Line 47, "the" (second occurrence) should be deleted.

COLUMN 11

Line 19, "$x \simeq m*ax*(\theta x'bx)$ . . . . . (3)" should read

--$x \simeq m * ax * (\theta x + bx)$ . . . . . (3)--.

UNITED STATES PATENT AND TRADEMARK OFFICE
CERTIFICATE OF CORRECTION

PATENT NO. : 5,579,080

DATED : November 26, 1996

INVENTOR(S) : YOSHIAKI IRIE, ET AL.

It is certified that error appears in the above-indentified patent and that said Letters Patent is hereby corrected as shown below:

COLUMN 12

Line 53, "$\theta 0 - \theta 15$" should read $\delta 0 - \delta 15$--.
Line 57, "in" should be deleted.
Line 61, "$V_{15}$." should read --$S_{15}$.--.

COLUMN 16

Line 38, "(F-LED) 22" should read --(F-LED)22.--

COLUMN 18

Line 43, "a" should read --$\alpha$--

COLUMN 20

Line 45, "area:" should read --area;--.

Signed and Sealed this

Twentieth Day of May, 1997

Attest:

BRUCE LEHMAN

Attesting Officer

Commissioner of Patents and Trademarks